United States Patent
Rabyking

(10) Patent No.: US 10,460,622 B2
(45) Date of Patent: Oct. 29, 2019

(54) ASSISTED PROGRAMMING USING AN INTERCONNECTABLE BLOCK SYSTEM

(71) Applicant: Adigal LLC, Westlake Village, CA (US)

(72) Inventor: Serge Rabyking, Barrow Upon Soar (GB)

(*) Notice: Subject to any disclaimer, the term of this patent is extended or adjusted under 35 U.S.C. 154(b) by 160 days.

(21) Appl. No.: 15/607,090

(22) Filed: May 26, 2017

(65) Prior Publication Data

US 2018/0342172 A1 Nov. 29, 2018

(51) Int. Cl.
- *G09B 19/00* (2006.01)
- *G09B 1/32* (2006.01)
- *G09B 1/36* (2006.01)

(52) U.S. Cl.
CPC ......... *G09B 19/0053* (2013.01); *G09B 1/325* (2013.01); *G09B 1/36* (2013.01)

(58) Field of Classification Search
CPC .................................................. G09B 19/0053
USPC .......................................................... 434/118
See application file for complete search history.

(56) References Cited

U.S. PATENT DOCUMENTS

2016/0005421 A1* 1/2016 Gratzel .............. G10L 15/1822
704/200.1

OTHER PUBLICATIONS https://scratch.mit.edu/projects/editor/?tip_bar=home.
Algoblock: a tangible programming language, a tool for collaborative learning, available at https://www.researchgate.net/publication/242383829.

* cited by examiner

*Primary Examiner* — Kesha Frisby
(74) *Attorney, Agent, or Firm* — Chhabra Law Firm, PC

(57) ABSTRACT

Using various embodiments, methods and systems for assisted programming using an interconnectable block based system are described. In one embodiment, the system comprises a plurality of interconnectable blocks, and a processing unit. The processing unit can determine a programming language construct, or the portion thereof, based on a sequence in which the plurality of interconnectable blocks are connected to each other and execute the programming language construct, or the portion thereof, and transmit the output to an output device. The output device, can be coupled to the interconnectable block based system and can be at least an electroacoustic transducer device or an electroluminescent device.

18 Claims, 17 Drawing Sheets

Symbol Blocks 401

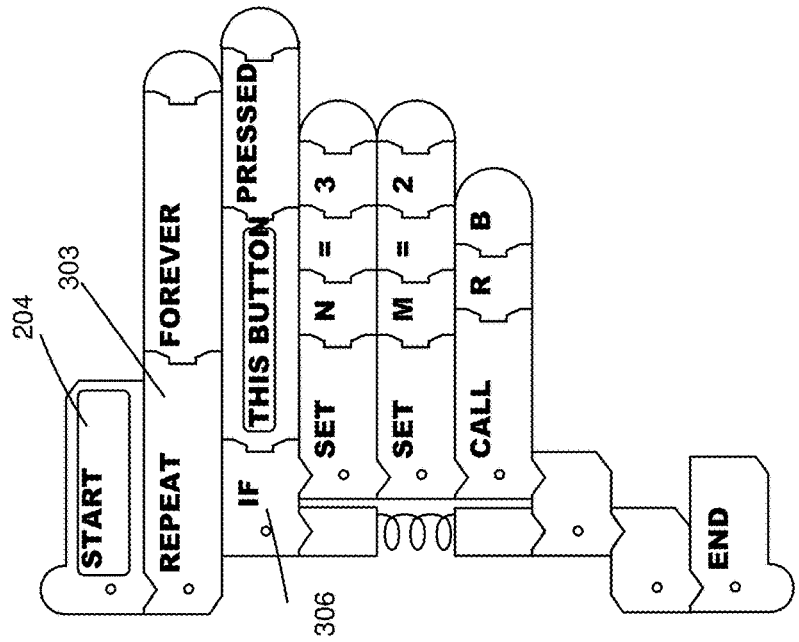
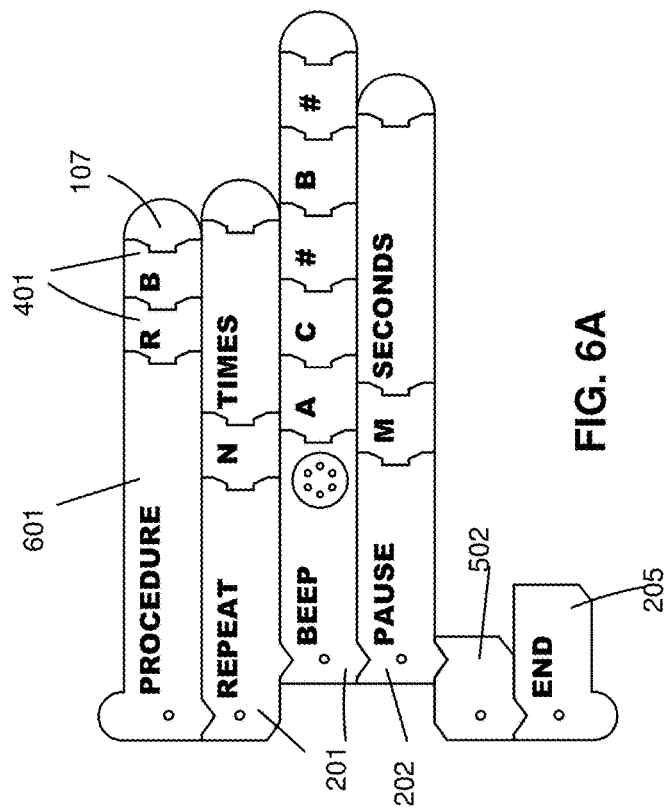
FIG. 6B
FIG. 6A

ASSISTED PROGRAMMING USING AN INTERCONNECTABLE BLOCK SYSTEM

FIELD OF THE INVENTION

Embodiments of the present invention relates generally to development of educational aides. More particularly, embodiments of the invention relate to an educational kit to learn computer programming using physical interconnectable blocks.

BACKGROUND OF THE INVENTION

Conventionally, computer programming has been taught using flow charts and pseudo code and a learner is expected to start typing code on a user interface of a computing machine. Statistics show that, currently, women are less likely to engage in computer coding and programming related jobs than men. To overcome this gap, the general consensus is to encourage children how to learn programming and coding concepts at an early age. Since children, regardless of their gender, tend to learn new concepts and techniques comparatively faster than adults, learning how to code at a young age can foster critical thinking, problem solving, and decision making skills in an aspiring and curious mind of a child.

However, existing computer programming and coding techniques can be overwhelming and confusing for a majority of children as well as adults, which can result in a lack of interest towards programming. Therefore, what is needed are techniques that can engage a learner to grasp the complex subject matter of computer coding and programming with a fun and easy to learn systematic approach.

SUMMARY OF THE DESCRIPTION

Using various embodiment, an interconnectable block based system is described. In one embodiment, the system comprises a plurality of interconnectable blocks coupled to a processing unit. The processing unit, in one embodiment, can be configured to determine a programming language construct, or a portion thereof, based on a sequence in which the plurality of interconnectable blocks are connected to each other and execute the programming language construct, or the portion thereof, and transmit the output to an output device coupled to the interconnectable block based system. In one embodiment, the output device can be an electroacoustic transducer device (e.g., a speaker) or an electroluminescent device (e.g., a Light Emitting Diode (LED) based system.

In one embodiment, the output device is embedded within at least one of the plurality of interconnectable blocks. In another embodiment, the plurality of interconnectable blocks includes at least one of a start interconnectable block, an end interconnectable block, a command interconnectable block, a symbol interconnectable block, or an operator interconnectable block. In another embodiment, an interconnectable block has at least one pinhole that can accommodate another electroluminescent device to indicate a particular state of the interconnectable block. The one pinhole, in one embodiment, can be configured to accommodate a special pin to establish a break point. In one embodiment, an interconnectable block can be further configured to accommodate an electronic debugger to determine an error or inconsistency in the program construct, or a portion thereof, and can transmit an error code to an interface indicating the error or inconsistency.

BRIEF DESCRIPTION OF THE DRAWINGS

The present invention is illustrated by way of example and not limitation in the figures of the accompanying drawings in which like references indicate similar elements.

FIG. 6A illustrates the construction of program functions using procedure interconnectable blocks of an interconnectable block system, according to one embodiment of the present invention FIG. 6B illustrates the usage of procedure interconnectable blocks in a main executable program of an interconnectable block system, according to one embodiment of the present invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Figure 1:
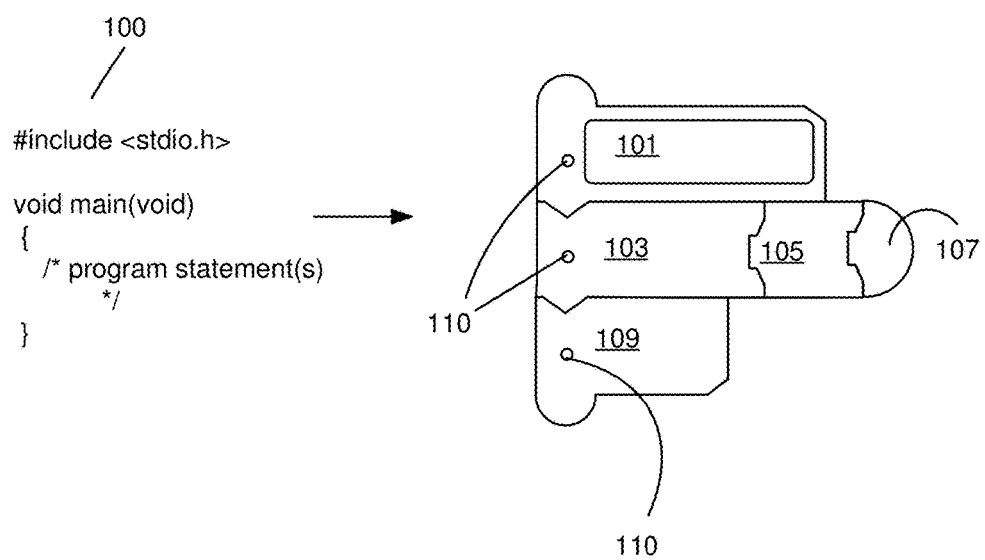
FIG. 1 illustrates diagram describing the assembly of an interconnectable block system that, in one embodiment, is designed to connect interconnectable blocks to create a computer program.

FIG. 1 illustrates a block diagram describing the assembly of an interconnectable block system that, in one embodiment, is designed to connect interconnectable blocks to create a computer program. As illustrated, in one embodiment, an interconnectable block based system designed to educate a user about the fundamental concepts of computer programming is disclosed. In one embodiment, the interconnectable blocks based system is an educational kit comprising a plurality of interconnectable blocks, each interconnectable block representing at least one building block of a computer program. Each interconnectable block 101 can comprise an electronic circuit board (e.g., micro controller unit, or a portion thereof) with one or more interconnectable connectors or slots. Each interconnectable block can have, depending on its configuration, a top connector, a bottom connector, a left connector or a right connector. In one embodiment, an interconnectable block can be stacked vertically and/or horizontally with another interconnectable block when both interconnectable blocks have appropriate (e.g., complementary) connectors. When an interconnectable block has a vertically connected top connector, in one embodiment, such connector can correspond to the input of a program execution flow. A vertically connected bottom connector, in an embodiment, can correspond to the output of the program execution flow. When an interconnectable block, in an embodiment, has a left horizontal connector, the left connector can correspond to an output of a computer program execution. When an interconnectable block, in an embodiment, has a right horizontal connector, the right connector can correspond to an input of a program execution (e.g., receiving input parameters). In various embodiments, any connector (e.g., left horizontal connector, right horizontal connector, top vertical connector, or bottom vertical connector), can be configured to receive input or provide output, as needed. Interconnectable blocks connected horizontally can form a line/statement, in one embodiment, that could be read as a program language statement by a computing device. The first interconnectable block in a line/statement can be an interconnectable block that has no horizontal connector to the left, signifying that the interconnectable block has no blocks to the left to which it can communicate. The last interconnectable block in a line/statement represents a line/statement-end connector, signifying the end of a line/statement. In one embodiment, an interconnectable block can have the top, bottom, left right connectors, but is programmatically configured to disable one or more connectors, depending on how it is connected with another interconnectable block.

For the sake of clarity only, the following terms are defined to describe the invention herein; these terms are not intended to be limiting on the spirit of the invention described herein.

A line is a computer program statement, as known to a person having ordinary skill in the art.

A vertical connector in an interconnectable block is an input that is at the top edge of the block and provides an output at the bottom edge of the interconnectable block. Each vertically connected interconnectable block signifies the beginning of a new line or statement of computer program 100.

A horizontal connector receives input on the right side and provides an output on the left. In one embodiment, a line can equivalent to a single interconnectable block if it has no horizontal connectors.

As described herein, left and right sides are considered relative to a user or viewer of the system, that is, when an interconnectable block, connector, input, etc. is viewed from the front. Such a convention is used for ease of understanding the underlying invention. Thus, a left connector is a connector that is towards a viewer/user's left, and a right connector is a connector that is towards the user's right.

A line start interconnectable block is the first interconnectable block that starts a line. A line start interconnectable block, in one embodiment, has at least one vertical connector. In one embodiment, a line start interconnectable block can be a command, operator or flow control interconnectable block, as described further herein.

In certain embodiments, an interconnectable block, with a vertical connector, can have more than one outputs positioned left or right relative to the alignment of its input. A left aligned output (relative to the input connector) is called a left diversion, and a right aligned output (relative to the input connector) is called a right diversion. Similar to the convention used above, a left diversion, would be a diversion of the left side of the user, and a right diversion would be on the right, relative to the position of the input connector (as viewed from the front).

A person having ordinary skill in the art would appreciate that variants of an implementation of the above stated terms can be defined, and therefore, the invention need not be restricted to the above stated terms.

As illustrated, in FIG. 1, a computer program 100 is constructed using a combination of a plurality of interconnectable blocks 101-109. Each interconnectable block can signify a different element/building block of computer program 100, and a combination of different interconnectable blocks, along with the interaction of each interconnectable block with another, can generate computer program 100. Each interconnectable block constructs a portion of a computer program 100. Each interconnectable block, except for an end interconnectable block (which are usually represented by the last interconnectable blocks of an interconnectable block system), processes an input and transmits an output to another interconnectable block. Further, a line/statement-end connector does not process or transmits an input or output of computer program 100, but rather signifies the end of a line/statement and so that another line/statement, if any, can be processed.

As illustrated, interconnectable block 101 represents a start interconnectable block, having a bottom connector. The bottom connector of interconnectable block 101 communicates with the top connector of interconnectable block 103. The interconnectable block 103 with its right connector and interconnectable block 105 with its left connector communicate with each other through the formed connection. Interconnectable block 107 represents an end-line/statement connector. In one embodiment, a line/statement end-connector, does not have a right connector. Interconnectable block 109 represents an end interconnectable block, signifying the end of computer program 100.

In one embodiment, different types of interconnectable blocks can be used to provide different functionality of a program, thus different interconnectable blocks can correspond to operators, commands, symbols, flow control, etc. of a program construct. In one embodiment, an interconnectable block can have words or signs that can also be read or recognized by human beings. In another embodiment, an interconnectable block can have active components like an electroacoustic transducer device (e.g., Speaker) or an electroluminescent device (e.g., LED), Microphone, sensors or actuator or special connectors to connect with other interconnectable blocks.

In some embodiments, at least one interconnectable block has at least one pinhole 110 that can accommodate an electroluminescent device (e.g., LED) to indicate a particular state (or status) of the interconnectable block. In one embodiment, the particular state of the interconnectable block is recognized based on the illuminated color of the interconnectable block. In this embodiment, the electroluminescent device can display more than one color, each color indicating the current state/status of the interconnectable block. The electroluminescent device can provide a user a mechanism to determine program consistency and/or debugging. For example, red color can indicate an error or inconsistency around the interconnectable block (e.g., another interconnectable block is needed in order for the interconnectable block displaying the indicator to correctly work). Similarly, a green color can indicate that the interconnectable block can perform its function, and all dependency requirements (in the form of other interconnectable blocks) have been met.

In one embodiment, an electronic debugger (not shown) can be connected at the end of a line, instead of interconnectable block 107. The electronic debugger can assist a user of the system in determining an error or inconsistency (for example, the debugger can display or transmit an error code to an interface using which the user can determine the error or inconsistency). In one embodiment, at least one pinhole 110 can further be configured to accommodate a special pin to establish a break point at the line. In another embodiment, a special pinhole (that is, a pinhole that does not have an electroluminescent device) can be used to accommodate the special pin. Once the special pin is accommodated into pinhole 110, execution flow stops at the location of the breakpoint and a glow circle can be illuminated indicating the particular state of the interconnectable block. A debugger can then be connected at the line of the breakpoint to see the current status, or alternatively, inspect the values of any variables set by the interconnectable block system. In one embodiment, the execution flow continues once the special pin is removed from pinhole 110. In another embodiment, the electronic debugger can further be equipped with a continue button to continue execution flow past the special pin.

Figure 2:
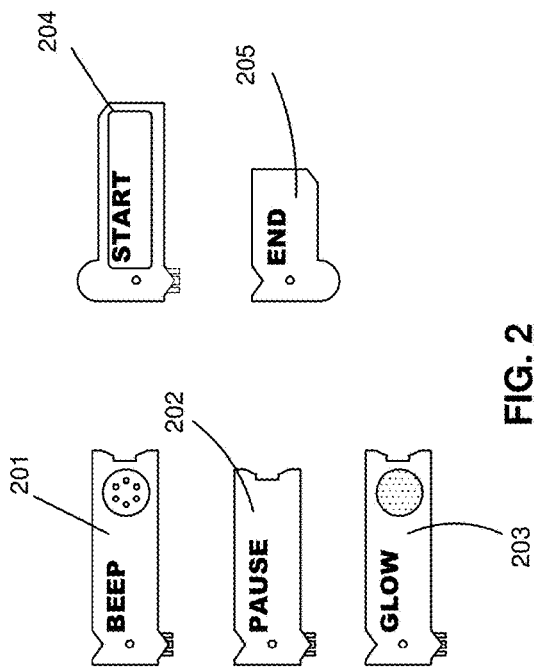
FIG. 2. illustrates command interconnectable blocks of an interconnectable block system, according to one embodiment of the present invention.

FIG. 2. illustrates command interconnectable blocks of an interconnectable block system, according to one embodiment of the present invention. Command interconnectable blocks with vertical connectors, in one embodiment, can form the program execution flow. Each command interconnectable block processes some information and transmits it to another interconnectable block. A command interconnectable block can be considered tantamount to a single action execution statement of a conventional computer program. Command interconnectable blocks have an input and an output and performs an action as a line/statement of a program without affecting the execution flow of the program. In one embodiment, the input and output connectors of the command interconnectable block can have the same vertical position. Therefore, the execution flow goes through a command interconnectable block and the output is received after the command interconnectable block processes the information. As an exemplary embodiment, command interconnectable blocks 201-205 are described. Interconnectable block 201, provides a beep command. Thus, during program execution if interconnectable block 201 is encountered, the output of interconnectable block 201 would result in interconnectable block system to transmit a signal to cause an audible notification (e.g., through a speaker connected to the system or a speaker system built-in within an interconnectable block). In this case interconnectable block 201 will also pass over any computing instructions to the next logical interconnectable block to continue the program execution. A logical interconnectable block, as described here, is any interconnectable block (vertically or horizontally connected) that is intended to receive input from another interconnectable block. Similarly interconnectable block 202 will, in one embodiment, pause execution of the program and interconnectable block 203 will cause the interconnectable block system to display a glow or light up a portion thereof.

In one embodiment, two special command interconnectable blocks, start interconnectable block 204 and end interconnectable block 205, can be introduced in a system implementing the techniques discussed herein. Start interconnectable block 204, in one embodiment, is adapted to not have a vertically top connector, and end interconnectable block 205 is adapted to not have a vertically bottom connector. These special command interconnectable blocks signify the initialization and termination of a program execution respectively.

Figure 3:
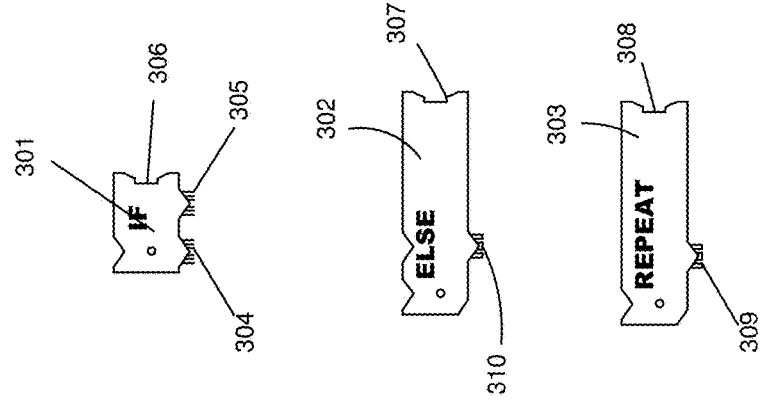
FIG. 3. illustrates operator interconnectable blocks of an interconnectable block system, according to one embodiment of the present invention.

FIG. 3. illustrates operator interconnectable blocks of an interconnectable block system, according to one embodiment of the present invention. An operator interconnectable block, in one embodiment, affects with execution flow of a program construct, that is, it directs the program execution flow. Operator interconnectable blocks with vertical connectors, in one embodiment, can thus form the program execution flow. Each operator interconnectable block processes some information and transmits it to another interconnectable block. Operator interconnectable blocks change the execution flow of a program. Operator interconnectable blocks can also have additional vertical outputs. Various exemplary operator interconnectable blocks are illustrated in FIG. 3. As illustrated, an operator interconnectable block 301 represents an 'if' operator that initiates a conditional statement in a computer program. A conditional statement is executed when a specific condition is satisfied, and is not executed when the condition is not met. Thus, interconnectable block 301 represents a conditional operator interconnectable block. Similarly, interconnectable block 302 also represents a conditional operator 'else' and transfers the program flow complementing the condition statement initiated by the 'if' operator (thus, executes the else condition statement when the condition represented by the 'if' operator is not satisfied). Another example of an operator interconnectable block can be interconnectable block 303 which provides the functionality of a loop. A loop operator performs a certain task n number of times, where n is an integer having an absolute non-zero value; the value of n is selected by the user using symbol interconnectable blocks, as described further herein.

An operator interconnectable block can have one or more output vertical connectors. As illustrated in interconnectable block 301, the 'if' operator interconnectable block has two output vertical connectors, 304 and 305. In this embodiment, connector 304 connects to a flow control interconnectable block, as further described herein, and connector 305 provides the output of the 'if' operator to the next logical line (if the condition is satisfied). Similar to a logical interconnectable block, a logical line is the subsequent statement to which control is passed on after the execution of the current line. Interconnectable block 301 also has a right connector 306 where the condition line/statement is executed during program execution. Similarly interconnectable blocks 302 and 303 can have right connectors 307 and 308 respectively, from where the system executes their respective conditions, if/when present. Interconnectable block 302 transfers flow to connector 310, from where the next logical line or statement is executed. In one embodiment, right connector 307 can provide a line/statement that is executed when the condition of interconnectable block 301 is unsatisfactory. In another embodiment, right connector 307 can be used to connect a debugger or interconnectable block 107. In one embodiment, block 302 can be without a right connector as an else block may not require any parameters. In any embodiment, any connector could accept a debugger (optionally with an adapter), if needed. In one embodiment, right connector 308 can provide a line/statement indicating number of times the loop needs to execute the line/statement connected by connector 309. Numerous other variants of any of the operator interconnectable blocks (e.g., 'if' interconnectable block) can be devised. For example, in one embodiment, an 'if' only operator can be devised, with end of flow block but without connector 304. If the condition at the right to the 'if' operator is satisfied then control can be transferred to the next block. In case when condition is not satisfied, a P-SKIP procedure can be used, as described further herein to have all internal blocks (of the if control flow segment) skip execution.

Figure 4:
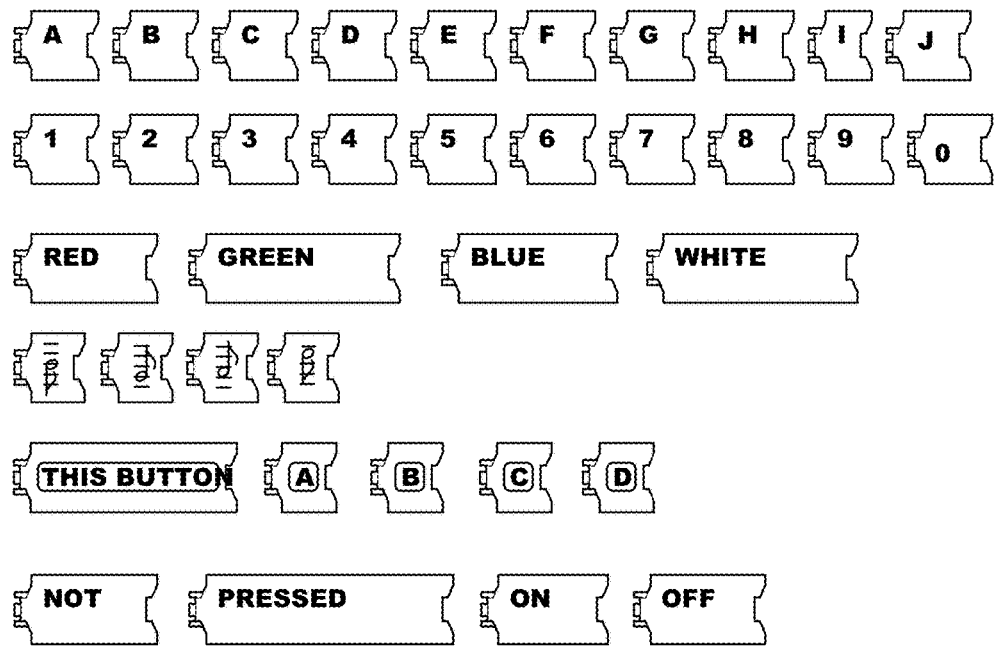
FIG. 4. illustrates symbol interconnectable blocks of an interconnectable block system, according to one embodiment of the present invention.

FIG. 4. illustrates various symbol interconnectable blocks 401 of an interconnectable block system, according to one embodiment of the present invention. As illustrated, each symbol interconnectable block does not have a top or bottom connector. In another embodiment, any interconnectable block can have one or more connectors that can be configured to perform the task of an interconnectable block. Thus, for an interconnectable block to be operable as a symbol interconnectable block that top and bottom connectors, if any, would need to be disabled. Generally, all symbol interconnectable blocks have a left connector and a right connector, except for an end-of-line interconnectable block which only has a left connector. Thus, in the embodiment described above, for an interconnectable block to be operable as an end-of-line symbol interconnectable block all connectors, except for the left connector would need to be disabled. Each line that starts with a command or operator, in one embodiment, can be terminated with an end-of-line symbol interconnectable block indicating that execution flow needs to be transmitted to the next logical line.

As illustrated, symbol interconnectable blocks 401 can be a letter, keyword, or special symbol. In one embodiment, symbol interconnectable blocks can also have a functional device embedded or connected to it. The functional device can be an LED, button, switch, actuator, sensor, or any other electronic device that can perform a function when connected to the interconnectable block system. In one embodiment, a keyword symbol interconnectable block can have the same functionality as a group of connected corresponding letter symbol interconnectable blocks. For example, a GREEN symbol interconnectable block can have the same functionality when symbol interconnectable blocks 'G', 'R', 'E', 'E', and 'N' are interconnected.

Figure 5:
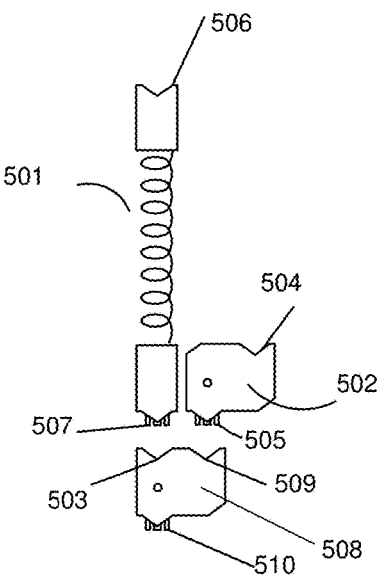
FIG. 5. illustrates flow control interconnectable blocks of an interconnectable block system, according to one embodiment of the present invention.

FIG. 5. illustrates flow control interconnectable blocks of an interconnectable block system, according to one embodiment of the present invention. As illustrated, these interconnectable blocks correspond to execution flow. In one embodiment, the flow control interconnectable blocks vertically complete the part of the program started with an operator interconnectable block. As illustrated, flow control interconnectable block 501 can have a wire (e.g., spring or non-spring based) used as part of a control interconnectable block since in some cases the execution flow could bypass a variable number of lines. While in one embodiment, the wire can provide electrical connection to complete a flow control circuit, in another embodiment, the wires when combined with blocks do not provide electrical connection and their usage can be to keep the interconnectable blocks together or in the proper order. Thus, in one embodiment, the wire can be constructed using a non-conductive material like plastic or rubber. In one embodiment, instead of connect flow block 501, the wire of a flow control block can be connected directly to a connected wire to a block (e.g., operator, command interconnectable block, etc.). Such an embodiment can assist the user by avoid missing end of an operator flow block. Such an embodiment can also assist the user with predefined coding patterns.

As illustrated, each flow control interconnectable block can have an input connector 506 and can output connector 507. Flow control interconnectable block 502, as illustrated can be used, in one embodiment, to indicate an end-of-flow-control-interconnectable block. Exemplary embodiments of flow control interconnectable blocks 502 and 508 are also illustrated. In one embodiment, flow control interconnectable blocks 502 and 508 signify the end of flow control segment (e.g., end of an if statement execution, end of an else statement execution, end of a loop, etc.). Flow control interconnectable blocks 502 and 508 can have one or more top connectors, as illustrated. As shown, flow control interconnectable block 502 has one top connector 504 and one bottom connector 505. In one embodiment, flow control interconnectable block 502 can be used to signify the end of the execution of at least one segment of a flow control. Similarly, flow control interconnectable block 508 can, in one embodiment, have at least two top connectors 503 and 509, and a bottom connector 510. In one embodiment, flow control interconnectable block 508 can signify the end of the flow control (e.g., end of an if-else block). In one embodiment, connector 507 can be coupled to connector 503 to define a control flow interconnectable block. In this embodiment, connector 509 indicates the end of an operator or command based statement(s) that are executed based on the satisfaction of a logical condition operable by flow control interconnectable block 501.

FIG. 6A illustrates the construction of program functions using procedure interconnectable blocks of an interconnectable block system, according to one embodiment of the present invention. As illustrated, named functions with procedure interconnectable block 601 can be used instead of a start interconnectable block, in one embodiment. In this embodiment, procedure interconnectable block 601 provides a procedure definition and accepts a procedure name, and optionally input parameters, as input (presented to the right of interconnectable block 601). In one embodiment, symbol interconnectable blocks 401 can follow procedure interconnectable block 601 to signify the procedure name. A program construct of interconnectable block 601 followed by one or more symbol interconnectable blocks 401 forms the procedure definition that, in one embodiment, can be followed by the body of the procedure, as illustrated. In the exemplary embodiment of FIG. 6A, a procedure RB is defined. In this embodiment, the procedure beeps chords A, C#, and B#, n number of times, where n is set by the user in a main executable program (that can be identified by the program construct using start interconnectable block 204, for example). The procedure then pauses for m seconds, which is also set by the user in the main function. As illustrated, various interconnectable blocks (e.g., interconnectable block 201, interconnectable block 202) can connect to various symbols interconnectable blocks to form conditions or perform actions, as illustrated. Similarly a flow control interconnectable block 502 can be used to signify an end-of-flow-control-interconnectable block, followed by end interconnectable block 205, to signify the end of the procedure.

FIG. 6B illustrates the usage of procedure interconnectable blocks in a main executable program of an interconnectable block system, according to one embodiment of the present invention. As illustrated, start interconnectable block 204 identifies the main executable function, according to one embodiment of the present invention. Operator interconnectable block 303 identifies the repeat operation which is followed by a symbol interconnectable block signifying to repeat the operation in an endless or "forever" loop. Thereafter, program flow is transferred to 'if' command interconnectable block 306. One the condition followed by 'if' command interconnectable block 306 is satisfied, the interconnectable block system sets the values of variables n and m, which are then transmitted to procedure RB, and control is transferred to the procedure as described in FIG. 6A.

Figure 7:
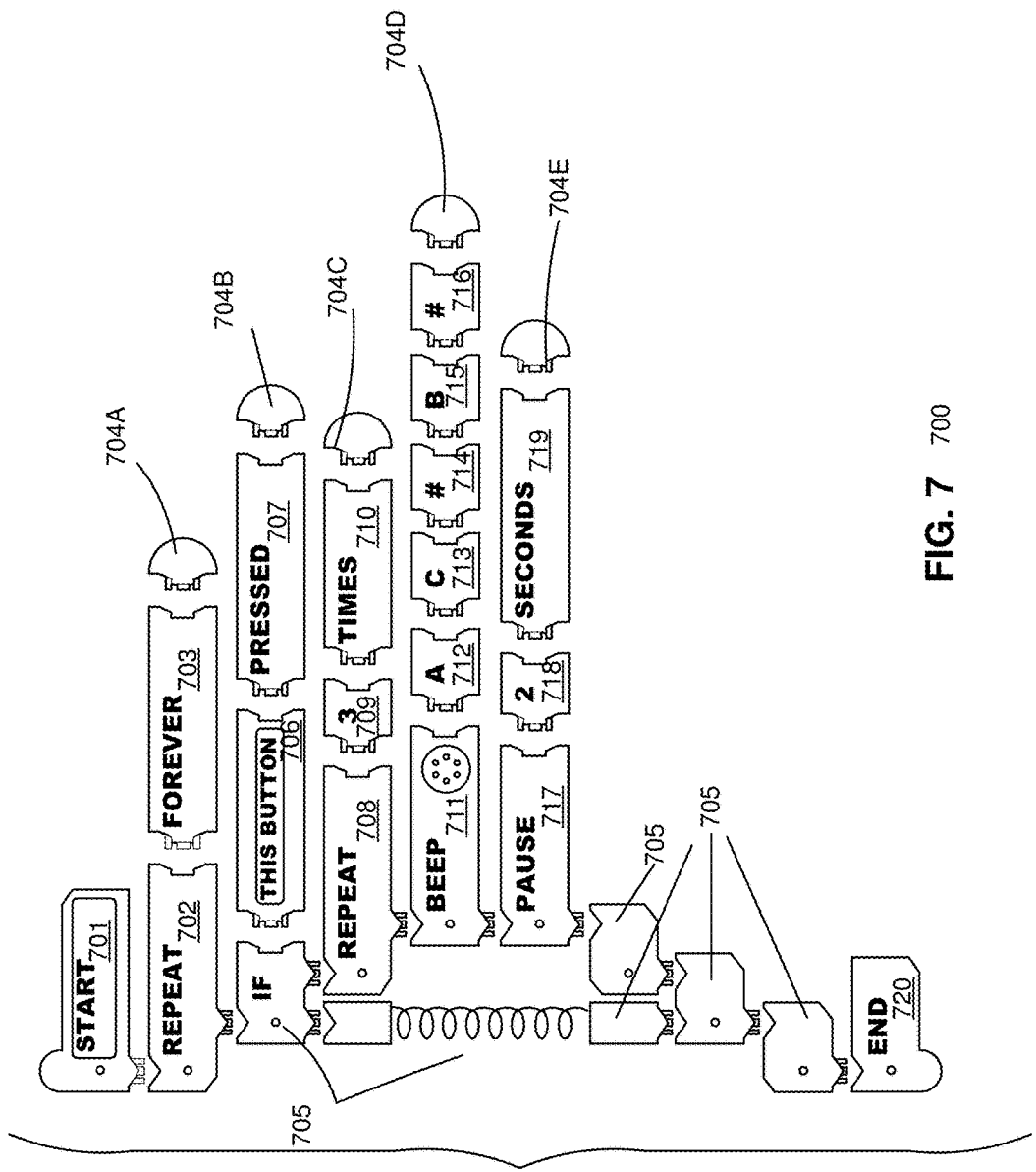
FIG. 7 illustrates an exploded view of an exemplary embodiment of computer program 700, according to one embodiment of the present invention.

FIG. 7 illustrates an exploded view of an exemplary embodiment of computer program 700, according to one embodiment of the present invention. As illustrated, interconnectable start interconnectable block 701 signifies the initiation of a computer program. Interconnectable block 701 is coupled to interconnectable block 702 that signifies a repeat operator followed by a 'forever' loop identified as interconnectable block 703. Interconnectable block 703 connects to end-of-line interconnectable block 704A. Thereafter execution flow is passed on to control flow construct 705 (comprising one or more interconnectable blocks 301, 501 and 502, as illustrated), which only executes when the condition of the control flow interconnectable block is satisfied. As, illustrated, condition of control flow construct 705 is satisfied when button 706 is pressed, the condition defined by interconnectable block 707. Interconnectable block 707 is coupled to end-of-line interconnectable block 704B, thus execution flow is transferred to the next line of control flow construct 705. In one embodiment, an end-of-line interconnectable block 704C within control flow construct 705 is considered as an end of a sub-line within control flow construct 705. In such an embodiment, the complete control flow interconnectable block, including any end-of-line interconnectable blocks 704(A-E), is considered as a single logical line or statement of computer program 700.

Once the condition is satisfied at control flow construct 705, control flows to interconnectable block 708 where 'repeat' operator is followed by the rule defined by the combination of interconnectable blocks 709 and 710. As illustrated herein, beep interconnectable block 711 has a built in speaker, and performs the actions as defined by interconnectable blocks 712-716 (which instruct beep interconnectable block 711 to beep tunes for musical notes (or in another embodiment chords with root note) of A, C# and B#, followed by end-of-line interconnectable block 704D. Interconnectable blocks 717-719 and end-of-line interconnectable block 704E define the action of pausing 2 seconds before control is transferred back to 'repeat' interconnectable block 708 where the execution is repeated two more times. Once control flow construct 705 is exited, control is transferred to interconnectable block 720 where computer program 700 terminates.

Exemplary System Architecture

Figure 8:
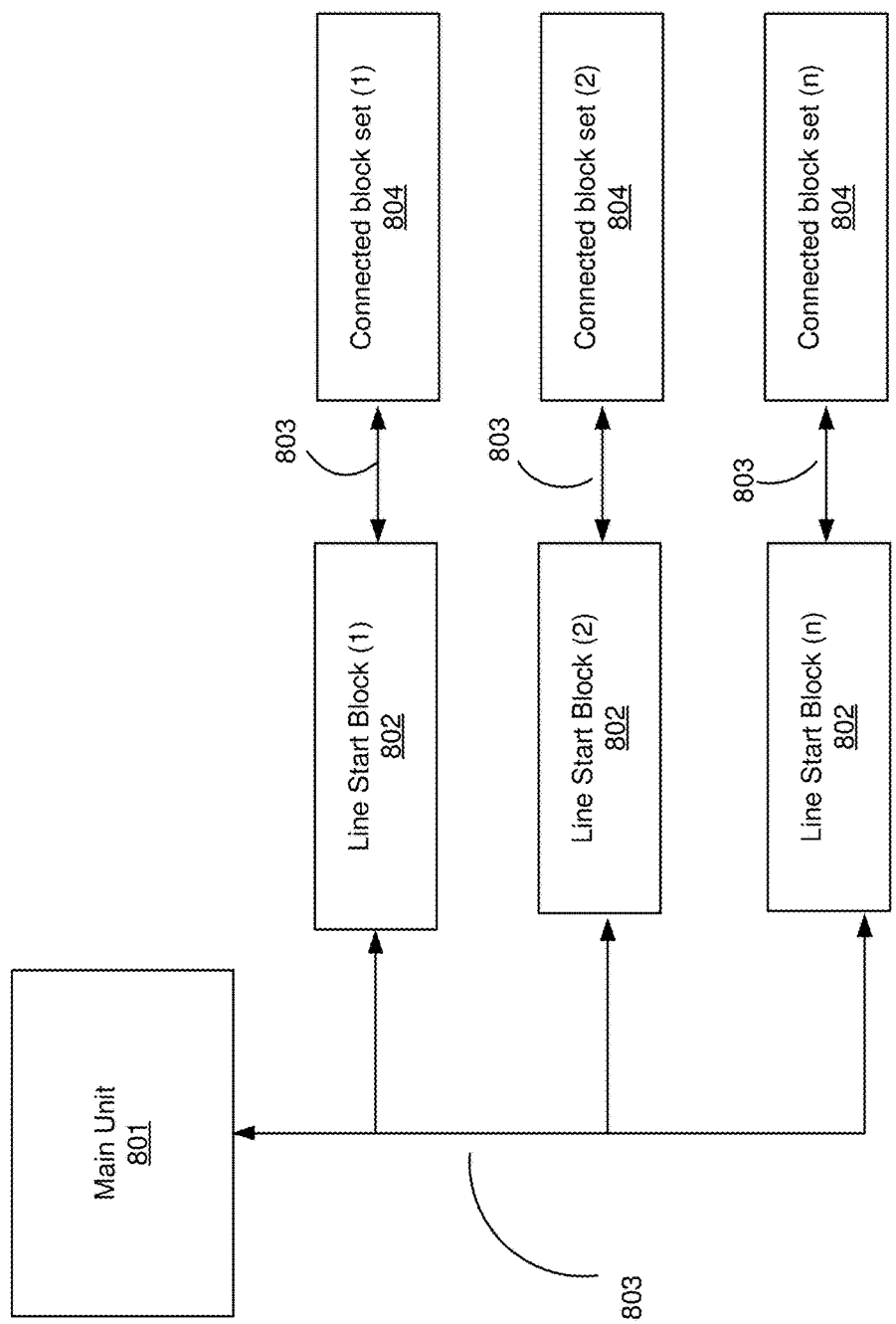
FIG. 8 illustrates an interconnectable block diagram of the processing units used in constructing a computer program of an interconnectable block system, according to one embodiment of the present invention.

FIG. 8 illustrates an interconnectable block diagram of the processing units used in constructing a computer program of an interconnectable block system, according to one embodiment of the present invention. In one embodiment, each inter-connectable interconnectable block can comprise an electronic component (e.g., microprocessor, circuit board, chip, transistor, logic gate, etc.), or a part thereof, and a combination of a plurality of interconnectable blocks forms a complete circuit that can execute a computer program. Each electronic component residing within each interconnectable block can be configured to operate according to a rule or condition that affects a particular state of a computing machine when executing the computer program.

In one embodiment, at least one processing device (e.g., micro-controller) is coupled to the interconnectable block system, referred to as the main unit herein, that controls the execution of the computer program constructed using the interconnectable blocks. In one embodiment, main unit 801 can be included within an interconnectable block of the interconnectable block system that is connected to line start interconnectable blocks 802 via a bus 803. In one embodiment, bus 803 can be a standard Inter-Integrated Circuit (I2C) hardware interface for vertical and/or horizontal communication. A person of ordinary skill in the art would appreciate that appropriate bus technology (rather than I2C) can be used for hardware communication in an interconnectable block based system. In one embodiment, bus 803 can include a serial shift between horizontal connectors, an I2C bus between vertical connectors, or a combination thereof. In another embodiment, bus 803 could signify a global bus that can communicate between both vertical and horizontal connectors.

In yet another embodiment, each line start interconnectable block 802 has a micro-controller. In such an embodiment, main unit 801 may not be present and all the processing is performed and communicated by line start interconnectable blocks. In another embodiment, at least one line start interconnectable block can perform the function of main unit 801. Further yet, another embodiment can use a combination of both main unit 801 and at least one line start interconnectable block 802 to execute the computer program. Each line start interconnectable block can be connected to other interconnectable blocks (e.g., symbol interconnectable blocks, parameters, etc.) collectively referred to as connected interconnectable block set 804 herein.

In an exemplary embodiment, each interconnectable block has a unique identification code associated with it. In this embodiment, once a computer program is formed by the interconnection of various interconnectable blocks, each interconnectable block connects to one or more sub-networks. A computing system (e.g., main unit 801) coupled to the network then scans the identification codes of each interconnectable block, and a connection order is identified and loaded to be executed by the computing system. In another embodiment, the computing system is located within a main interconnectable block (e.g., start interconnectable block), and executes the program in an interactive way by sending commands through the networks to the interconnectable blocks to change its state (e.g., turn on LED, perform some action, etc.), and receives messages from the interconnectable blocks of their state changes and user interactions.

In yet another embodiment, at least a plurality of interconnectable blocks can off-load the functionality from a main interconnectable block or computer. In this embodiment, line start interconnectable blocks 802 (e.g., command interconnectable blocks, operator interconnectable blocks, control flow interconnectable blocks, etc.) can scan right sequence of connected symbol interconnectable blocks as parameters then perform the action and at the end give execution control to the next command or operator interconnectable block by sending special message. In yet another embodiment, a plurality of interconnectable blocks act as execution units (e.g., micro-controllers) to form the interconnectable block system. In this embodiment, no main interconnectable block or computer is coupled to the network, and instead execution is spread through the plurality of execution units as a network of cooperated devices.

Figure 10:
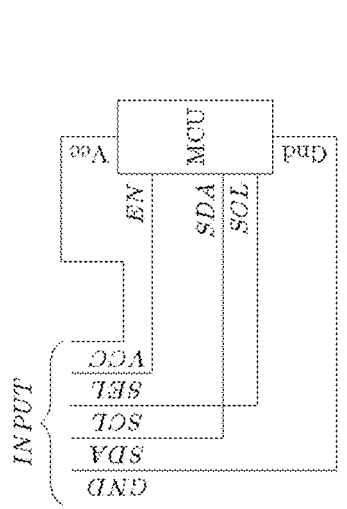
FIGS. 9 and 10 illustrate a schematic of a Start interconnectable block and End interconnectable block respectively, according to one embodiment of the present invention.
Figure 9:
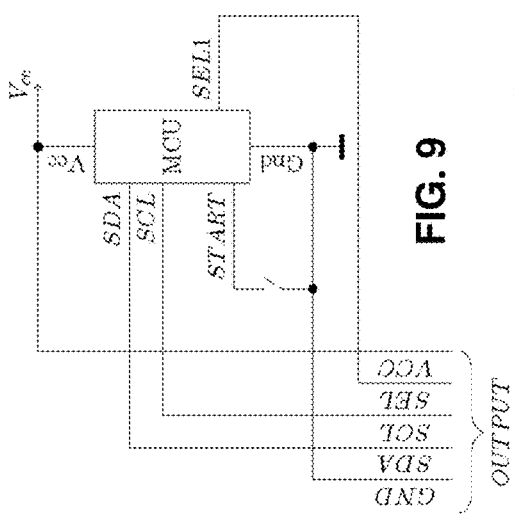

FIGS. 9 and 10 illustrate a schematic of a Start interconnectable block and End interconnectable block respectively, according to one embodiment of the present invention. As illustrated, in one embodiment, each vertical connector can have five connecting wires, representing power (VCC), ground (GND), two I2C wires, serial clock line of the I2C interface (SCL), serial data line of the I2C interface (SDA), and a special select output (SEL) wire, connected to a micro-controller unit (MCU). The start interconnectable block, in one embodiment, can have a physical button that starts the execution of the assembled program (referred to as START in FIG. 8). A person of ordinary skill in the art would appreciate that the schematics for this interconnectable block can be varied for power savings. In one embodiment, the physical button could power the micro-controller a first time and the micro-controller can hold the power connected via the separate relay or transistor until the program execution completes. In another embodiment, Start interconnectable block could have wired or the wireless connection to a Procedure interconnectable block or to another interconnectable block/processing system.

Figure 11:
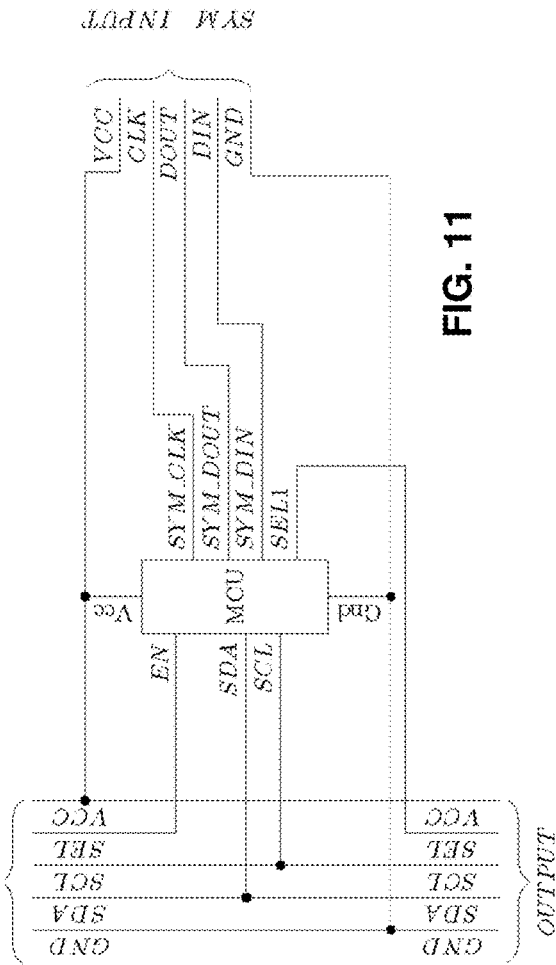
FIGS. 11 and 12 illustrate an Interface schematics of a line start interconnectable block with single output and two outputs, respectively, according to one embodiment of the present invention.
Figure 12:
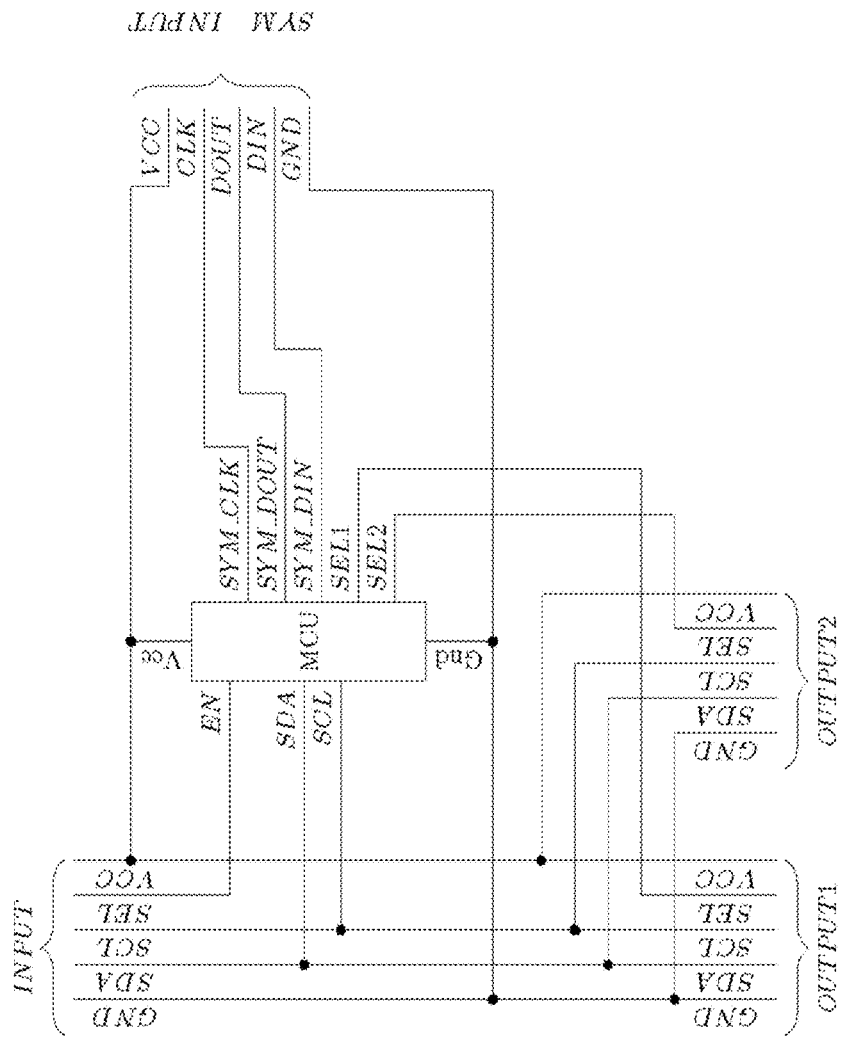

FIGS. 11 and 12 illustrate an Interface schematics of a line start interconnectable block with single output and two outputs, respectively, according to one embodiment of the present invention. As illustrated, in a line start interconnectable block, the vertical output has all wires (GND, SDA, SCL, VCC), as described above, except SEL is internally connected to corresponding vertical input wires. The micro-controller unit of any line start interconnectable block could enable and disable internally its I2C interface and it can be disabled at the beginning when micro-controller powers on. In one embodiment, the rising edge of the input SEL signal signifies that an interconnectable block's micro-controller enable its I2C interface. When the interconnectable block needs to pass control to another interconnectable block it can, in one embodiment, send a signal through corresponding SEL1 (select line for the first output) or SEL2 (select line for the second output), pins and then disable its own I2C interface, thereby providing a 'pass-to-the-next' functionality. Further, such an embodiment guarantees that at a given time interval only one interconnectable block communicates to the main unit (the module, interconnectable block, or device controlling the execution of the computer program). For the ease of convenience, the communicating interconnectable block, with enabled I2C interface, can be described as an active interconnectable block. As illustrated, EN refers to an enable signal, SYM_CLK refers to the symbol interconnectable block interface clock output, SYM_DOUT refers to symbol interconnectable block interface data output, SYM_DIN refers to symbol interconnectable block interface data input, CLK refers to the system clock, DIN refers to the data input, and DOUT refers to the data output.

In yet another embodiment, at least one interconnectable block can have two vertical input connectors. In such interconnectable blocks, the micro-controller can have two input pins connected independently to SEL wires of the input connectors. In this embodiment, the micro-controller operates in a similar manner for each SEL signal and enables its I2C interface, as described herein, but in addition it also stores, preferably in memory, the information of which input made it active. The communication can be described as a main unit send command (as data sequence) through I2C interface and receives back the reply message (which can also be a data sequence). In this embodiment, main unit can have a master role on I2C bus and the active interconnectable block representing a slave role. The standard I2C interface, in one embodiment, provides the main unit to determine if there is no active interconnectable block (signifying no connection).

Figure 13:
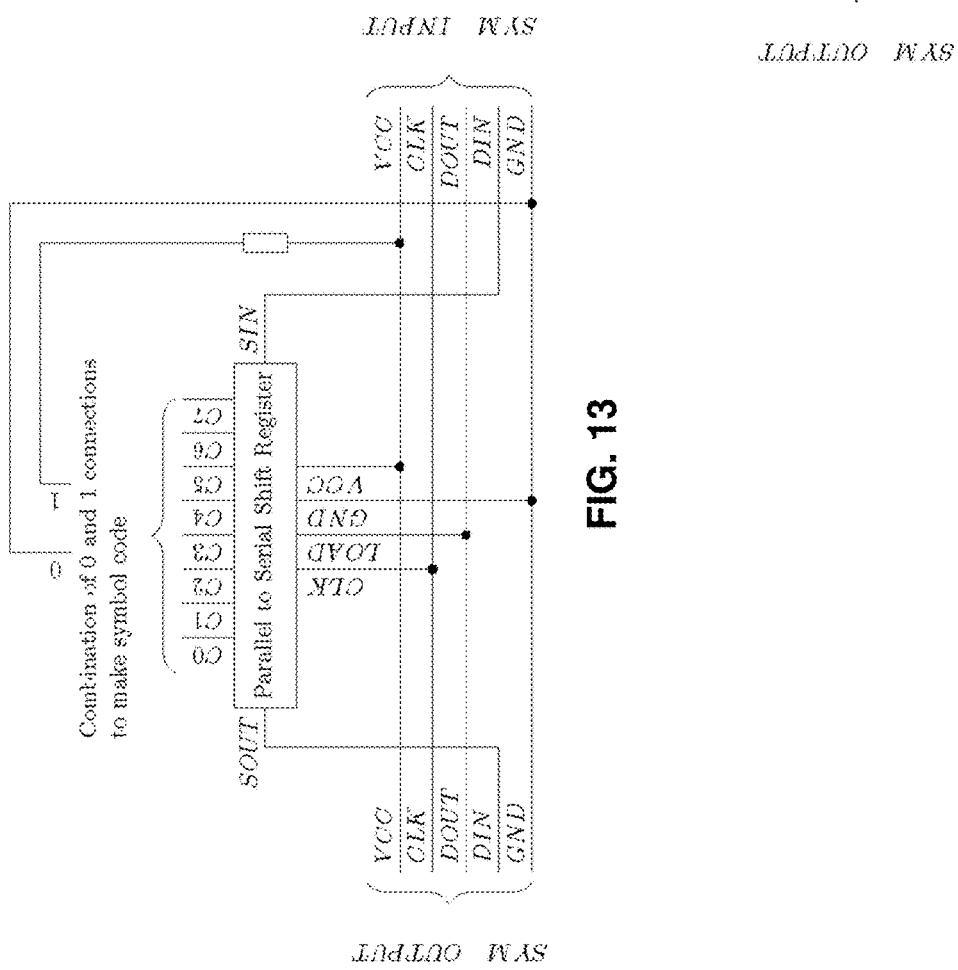
FIG. 13 illustrates an Interface schematics of the symbol interconnectable block, according to one embodiment of the present invention.

FIG. 13 illustrates an Interface schematics of the symbol interconnectable block, according to one embodiment of the present invention. Symbol interconnectable blocks, in one embodiment, are those with horizontal connectors and without vertical. According to one embodiment, symbol interconnectable blocks do not have a micro-controller inside and implemented with Parallel to Serial shift registers. As illustrated, all wires of the symbol interconnectable block input excluding DIN are connected to the corresponding wire of the output. In one embodiment, the symbol interconnectable block code can be encoded as a combination of 0 and 1 hardware connected inputs of a shift register. In another embodiment, instead of shift registers, a unique value is assigned to each symbol interconnectable block and measured by main unit 801. For example, in one embodiment, a resistance value from an electronic circuit within each symbol block can be measured and evaluated with a sequential switch (e.g., D-type trigger flip-flop switch) to generate a unique value assigned to each symbol block. A person of ordinary skill in the art would appreciate various other techniques can be implemented to assign and recognize an interconnectable block in various embodiments.

In one embodiment, the line start interconnectable block initiates code loading to the shift registers by sending pulse (signals) through the DOUT wire that is connected to all symbol interconnectable blocks of the line. Thereafter, line start interconnectable block can initiate clocking through CLK wire and process an entire code sequence through the DIN wire. Micro-controller can then stop clocking and stop processing when it receives the code with all ones or all zeros. All zeros can appear when there is no end of line interconnectable block connected and all ones can appear when an end of line interconnectable block is detected. In one embodiment, SIN refers to serial input, SOUT refers to serial output, LOAD refers to load data and C0, C1, C2, C3, C4, C5, C6, C7 each refers to code corresponding data inputs, as described further herein.

Symbol interconnectable blocks when connected together can produce wide multi-bit code that shifts and read bit by bit by micro-controller of the line start interconnectable block. In one embodiment, each symbol interconnectable block code can be represented as eight bits (C0-C7). In such an embodiment, the output can be standard symbolic multi-byte string. The symbol interconnectable blocks that have different states embed logic that changes the lowest bits. For example, button symbol interconnectable block can, in one embodiment, be represented as code 48 (representing American Standard Code for Information Interchange (ASCII) symbol 0) when not pressed and will have code 49 (representing ASCII symbol 1) when pressed. In one embodiment, this can be achieved by connecting the button switch between the lowest bit of the shift register and the 1 hardware signal, while other bits are connected accordingly to form code 48. In one embodiment, for the keyword interconnectable blocks, instead of several shift registers at least one micro-controller can comprise a whole symbolic line string that can perform as a single shift register.

Figure 14:
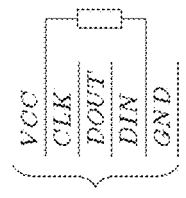
FIG. 14 illustrates an Interface schematics of an end-of-line symbol interconnectable block, according to one embodiment of the present invention.

FIG. 14 illustrates an Interface schematics of an end-of-line symbol interconnectable block, according to one embodiment of the present invention. As illustrated, end-of-line symbol interconnectable block can have the VCC, CLK, DOUT, DIN, and GND wires. In one embodiment, the end of line symbol interconnectable block can have a resistor to always generate a high signal at the DIN wire of its output.

Exemplary Operational Algorithm

In one embodiment, the interconnectable block system has a main computing unit embedded within start interconnectable block 204. Start interconnectable block 204 can provide power to other interconnectable blocks through connector wires. The micro-controller of interconnectable block 204 can, in one embodiment, perform the role of a 'master' in a standard I2C hardware interface, supplying a master clock for I2C communication with other interconnectable blocks (e.g., with each line start interconnectable block). In one embodiment, main unit 801 communicates with the active interconnectable block (e.g., line start interconnectable block 802) through the I2C bus with one or more bytes of information. Main unit 801 or each line start interconnectable block 802, depending on the embodiment, recognizes and responds at least to commands as described in table 1.

TABLE 1

| Command | Exemplary Implementation |
| --- | --- |
| INIT | Store in memory the command and variable LINENUM and flow FLOWNUM values |
| NEXT | Transmits control flow signal to the next interconnectable block; if there is only one output available transmits control flow signal through SEL1 pin, otherwise transmits control flow signal to SEL2 pin to make next start line interconnectable block the active interconnectable block. |
| CLOSE | Disables the bus (e.g., I2C interface) and ceases interconnectable block communication. |
| GETINFO | Provide interconnectable block ID and other information describing available inputs, outputs, left and right diversions and any other properties (all this data can be flashed within the firmware of the micro-controller). |
| GETLINE | Receive LINENUM and FLOWNUM variables associated with interconnectable block |
| GETBP | Transmit interconnectable block breakpoint state |
| EXEC | Operate according to programmed firmware (depending on interconnectable block type - command, operator, flow control, etc.); Active interconnectable block can read identifiers of connected symbol interconnectable blocks. After completion of the EXEC instruction the main unit receives result status and can pass control to the next interconnectable block by sending control flow signal through SEL1 or SEL2 pin of the micro-controller and disable interconnectable blocks I2C interface. Depending on the result the main unit could then execute special procedures like P-SKIP, as described herein. |
| CHECKLOOP | if interconnectable block does not correspond to execution loop then transmits 'false' value, otherwise interconnectable block analyzes its symbol parameter string and perform check if the loop will be repeated and transmits a 'true' value. |
| GLOWLED | Activate electroluminescent device |

As described in Table 1, in one embodiment, main unit 801 maintains two variables LINENUM and FLOWNUM. In one embodiment, these variables reflect the current location of execution within a computer program. Each line start interconnectable block can also have its LINENUM and FLOWNUM variables assigned once during the Init Procedure. The LINENUM variable corresponds to the line number of the computer program and FLOWNUM variable indicates the execution flow depth within each line. When during operation the active interconnectable block is changed, the main unit updates its LINENUM variable, and when flow is diverted to the right the FLOWNUM variable is incremented and when diverted to the left, the FLOWNUM is decremented.

In one embodiment, the main unit 801 recognizes and responds at least to the procedures as described in table 2.

TABLE 2

| Procedure | Exemplary Implementation |
| --- | --- |
| P-RESTART | Makes the line start interconnectable block connected immediately after the Start interconnectable block active. |
| P-INIT | Enumerates all line start interconnectable blocks connected to main unit and initialize each with the line number; optionally reset each interconnectable block to initial state. |
| P-START | Reset and Start execution of the program |
| P-ERROR | Make active interconnectable block indicate error through a connected electroluminescent device (e.g., multi-colored LED) |
| P-GOTO | Makes active the line start interconnectable block corresponded to the requested line number |
| P-UPDATE_LINE | Update LINENUM and FLOWNUM variable with the values requested from the active interconnectable block. |
| P-EXECUTE | Execute line by line the assembled program |
| P-LOOP | Perform check and if needed perform the execution loop |

TABLE 2-continued

| Procedure | Exemplary Implementation |
| --- | --- |
| P-SKIP | Skips all next blocks with FLOWNUM bigger than current block. |

Figure 15:
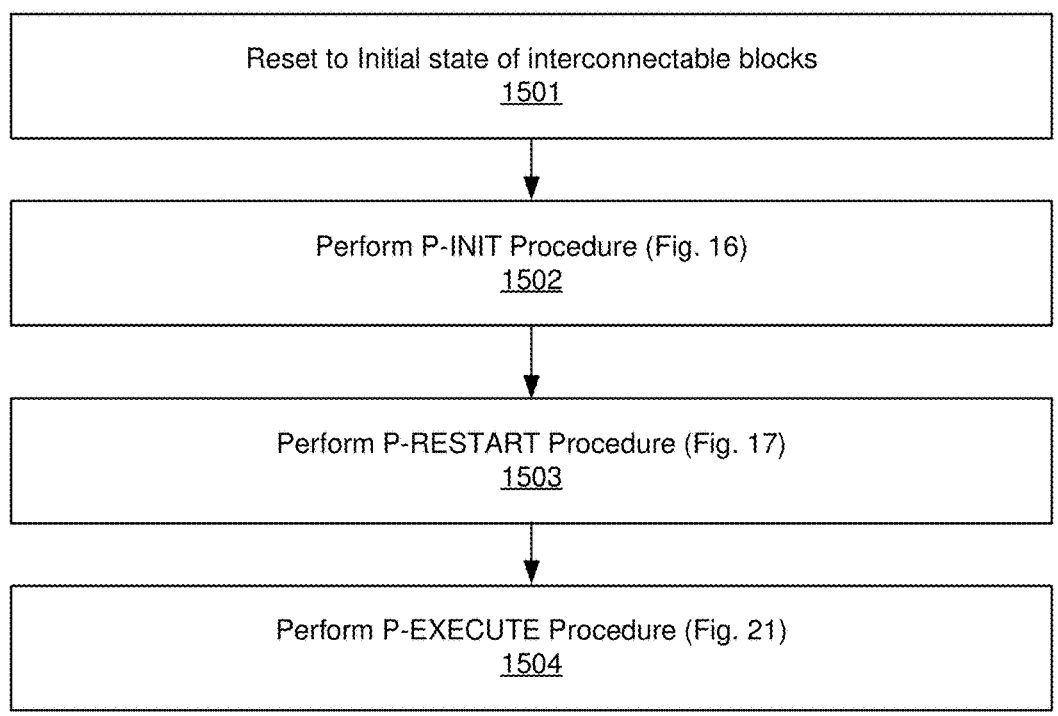
FIG. 15 illustrates a flowchart of a Start procedure, that can be implemented in a Start interconnectable block, according to one embodiment of the present invention.

FIG. 15 illustrates a flowchart of a Start procedure, that can be implemented in a Start interconnectable block, according to one embodiment of the present invention. In one embodiment, procedure P-START, as illustrated in table 2, can be implemented when a start button of the Start T interconnectable block is pressed. In this embodiment, the main unit 801 can perform P-START procedure, as illustrated in FIG. 15. As illustrated, at 1501 the system resets the interconnectable block based system to its initial state. At 1502, the system performs a P-INIT procedure, as described in table 2 and FIG. 16. Thereafter, at 1503, the system performs a P-RESTART Procedure, as described in table 2 and FIG. 17. At 1504, the system performs the P-EXECUTE procedure, as described in table 2 and FIG. 21.

Figure 16:
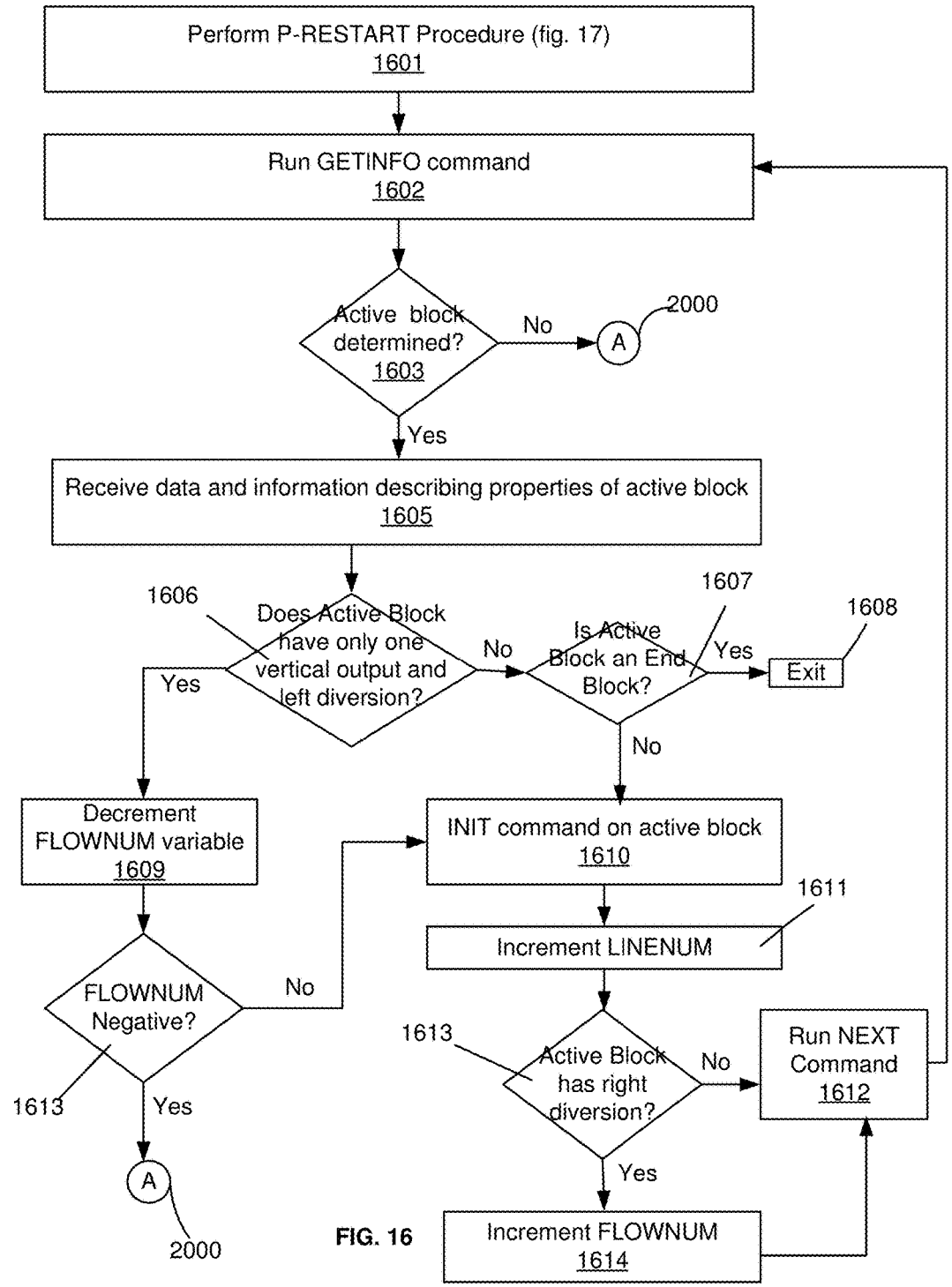
FIG. 16 illustrates a flowchart of an initialization procedure, that can be implemented in one embodiment of the present invention.
Figure 17:
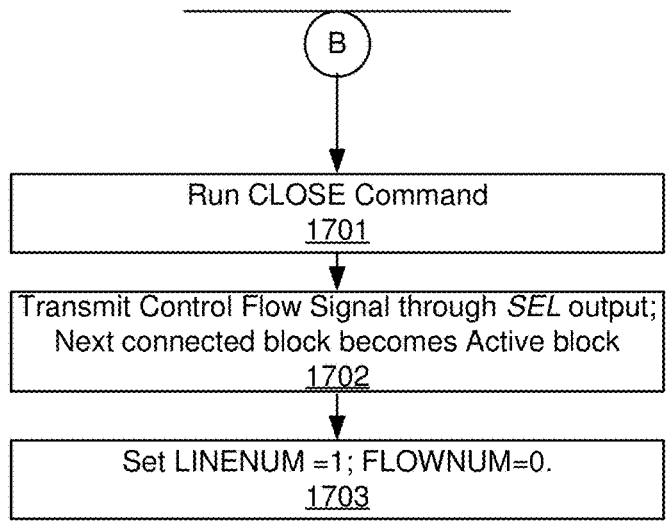
FIG. 17 illustrates flowchart 1700 implementing a Restart procedure, according to one embodiment of the present invention.

FIG. 16 illustrates a flowchart of an initialization procedure, that can be implemented in one embodiment of the present invention. In one embodiment, procedure P-INIT, as described in table 2 can be used as an initialization procedure for an interconnectable block system. As illustrated, at 1601, P-RESTART, as described in table 2, and FIG. 17, is performed. At 1602, GETINFO command is executed, as described in table 1. GETINFO command returns data with information describing properties of the active interconnectable block. If, at 1603, there is no active interconnectable block (e.g., no interconnectable block connected), main unit 801 can execute P-ERROR Procedure 2000 of FIG. 20, as identified by reference 'A'. If however, an active interconnectable block is determined and a valid response is received by main unit 801, as described at 1605. At 1606, if an it is determined that active interconnectable block has only one vertical output, and a left diversion is determined, then main unit 801 decrements the FLOWNUM variable at 1609. As described above, FLOWNUM variable indicates the execution flow depth within each line. If, however, the condition at 1606 is not satisfied, at 1607, it is determined that the active interconnectable block is an End interconnectable block then the procedure exits, at 1608. At 1613, If FLOWNUM is determined to have a negative value then control is transferred to flowchart 2000 and P-ERROR Procedure is executed. If either condition at 1607 or 1613 is not satisfied, then, at 1610, INIT command is executed on the active interconnectable block. Here, the current values of the LINENUM and FLOWNUM variables of the active interconnectable block are stored in memory by main unit 801. Thereafter main unit 801, increments LINENUM variable at 1611. At 1613, is it is determined that the active (current) interconnectable block has a right diversion, then at 1614, FLOWNUM variable is incremented, thereafter, the NEXT command at 1612 is executed, where main unit 801, in one embodiment, transmits control flow signal to the next interconnectable block; if there is only one output available then main unit 801 transmits control flow signal through SEL1 pin, otherwise main unit 801 transmits control flow signal to SEL2 pin to make next start line interconnectable block the active interconnectable block. If however, the condition at 1613 is not satisfied, then control is directly transferred to 1612, as illustrated. From 1612, control is transferred to 1602 and the process continues as described above.

FIG. 17 illustrates flowchart 1700 implementing a Restart procedure, according to one embodiment of the present invention. In one embodiment, P-RESTART procedure as described in table 2 can be implemented by flowchart 1700. As illustrated, at 1701 the CLOSE command, as described in table 1, is executed. This would result in determining if there is an active interconnectable block, it will disconnect itself from the system (e.g., disable its I2C interface). Thereafter, at 1702, a control flow signal is transmitted through the SEL output of the current interconnectable block and the next connected interconnectable block becomes active. At 1703, LINENUM variable is set to 1 and FLOWNUM variable is set to 0, in memory. Control is then passed back to the calling procedure (if any).

Figure 18:
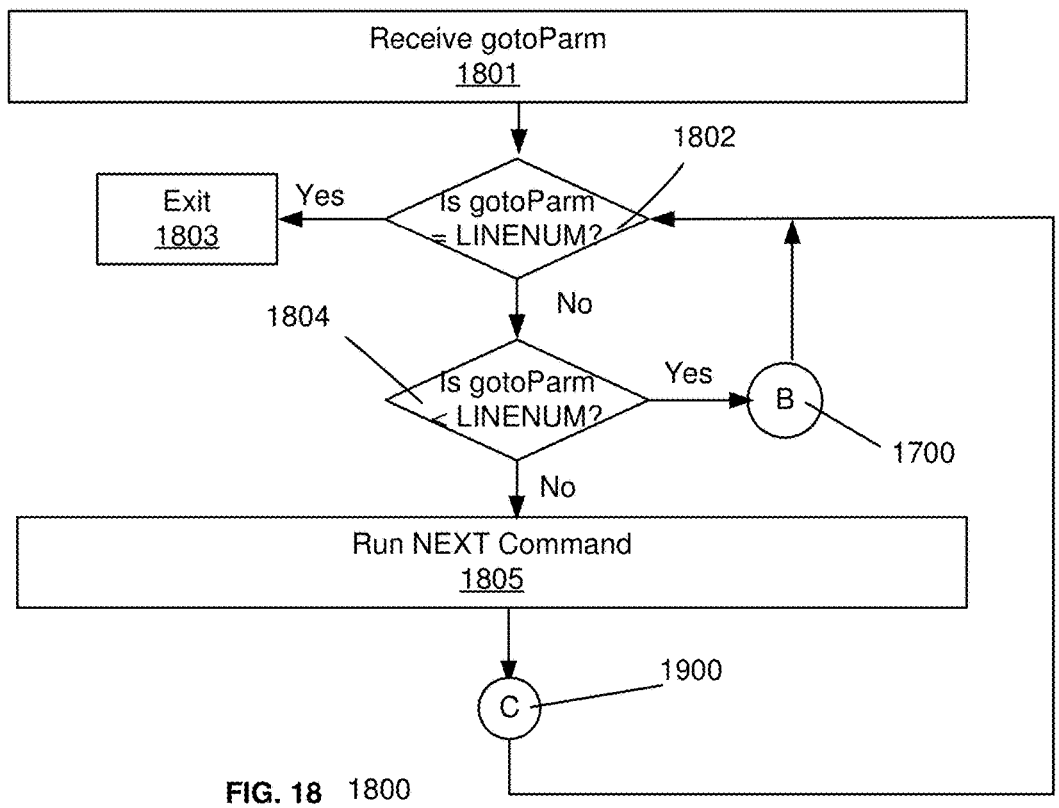
FIG. 18 illustrates flowchart 1800 describing a Go To Procedure, according to one embodiment of the present invention.

FIG. 18 illustrates flowchart 1800 describing a Go To Procedure, according to one embodiment of the present invention. In one embodiment, P-GOTO procedure, as described in table 2, can be implemented by flowchart 1800. As illustrated, at 1801 main unit 801, in one embodiment, receives the provided go to line number parameter, gotoParm. At 1802, if it is determined that the current value of LINENUM variable, equals to the line number to which control is to be transferred (as provided via gotoParm, then at 1803, the procedure exits. If however, the condition of 1802 is not satisfied, at 1804. The system determines whether the line number provided by gotoParm is less than the current LINENUM variable, and if so, control is transferred to P-RESTART procedure, 1700, as identified by reference 'B'. From there control flow passes back to 1802. However, if the condition at 1804 is not satisfied, the system runs the NEXT command at 1805. Here, main unit 801, in one embodiment, at the active interconnectable block, transfers control flow through SEL1 pin, if there is only one output available, otherwise transfers control flow through SEL2 pin, and makes the next available interconnectable block active. Thereafter, the system executes the P-UPDATE_LINE procedure, as described at flowchart 1900 of FIG. 19, and identified by reference 'C'. After the execution of P-UPDATE_LINE procedure control transfers back to 1802, as described above.

Figure 19:
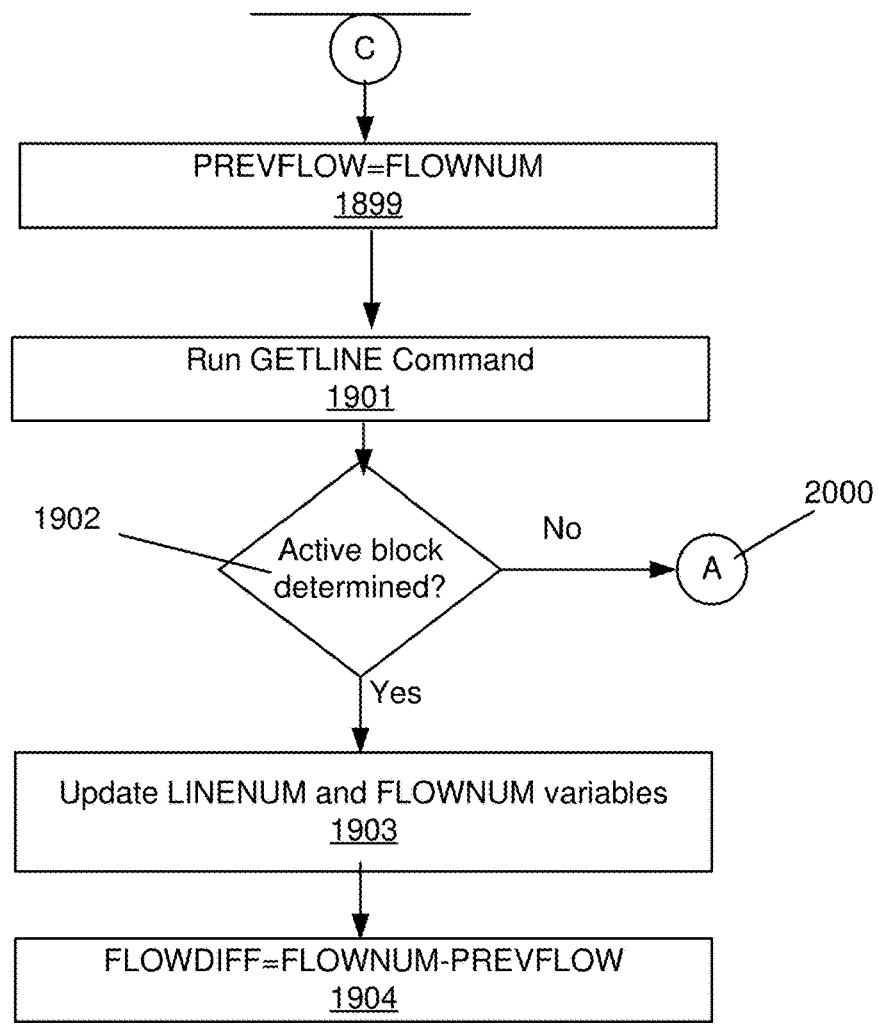
FIG. 19 illustrates flowchart 1900 implementing an Update Line procedure, according to one embodiment of the present invention.

FIG. 19 illustrates flowchart 1900 implementing an Update Line procedure, according to one embodiment of the present invention. In one embodiment, P-UPDATE_LINE procedure, as described in table 2, can be implemented as the Update Line Procedure. As illustrated, at 1899 a variable 'PREVFLOW' stores the value of the current Flow Number (FLOWNUM). At 1901, main unit 801, in one embodiment, executes the GETLINE command, as illustrated in table 1. Main unit 801 receives the line number and flow depth data of the active interconnectable block. If, at 1902, no active interconnectable block is determined, the system executes the Error Procedure as illustrated by flowchart 2000, identified by reference 'A'. At 1903, LINENUM and FLOWNUM variables with the values are updated as received from the interconnectable block. At 1904, the difference between the value received from the interconnectable block (in the updated FLOWNUM variable) and the previous value of the FLOWNUM (now stored in PREVFLOW variable) is saved into FLOWDIFF variable. Thus, FLOWDIFF variable, in one embodiment, can indicate change in the execution flow when a new active interconnectable block selected.

Figure 20:
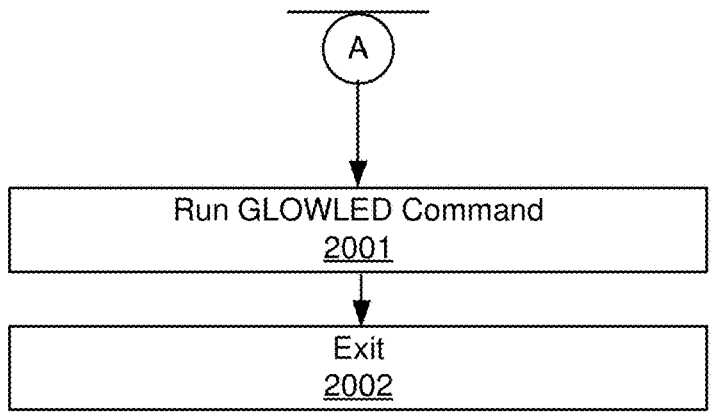
FIG. 20 illustrates flowchart 2000 implementing an Error Procedure, according to one embodiment of the present invention.

FIG. 20 illustrates flowchart 2000 implementing an Error Procedure, according to one embodiment of the present invention. In one embodiment, P-ERROR procedure can be implement as the Error procedure. As illustrated, at 2001, GLOWLED command with color information to indicate the error is executed. At 2002, the procedure exits.

Figure 21A:
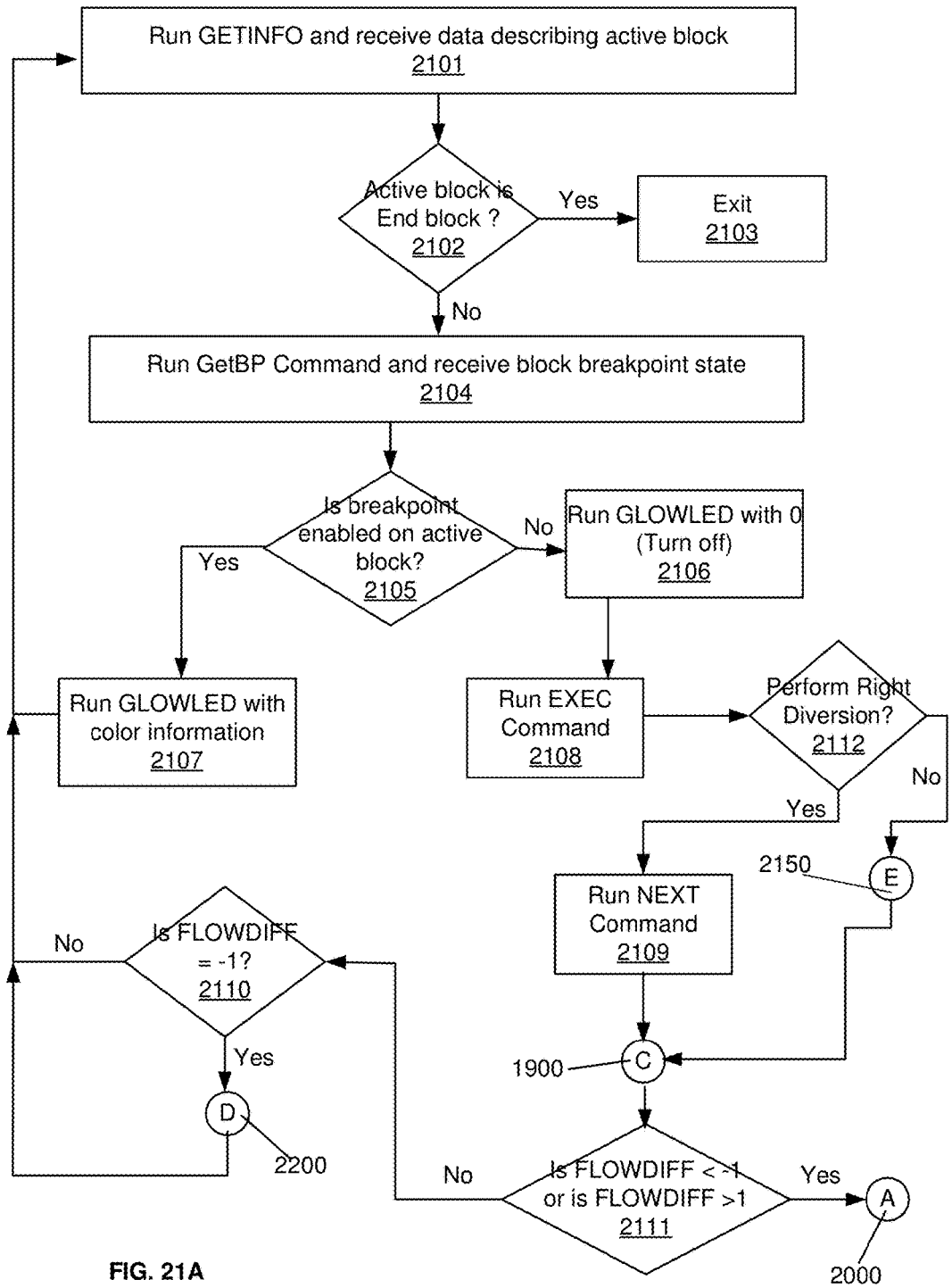
FIG. 21A illustrates a flowchart of an Execute procedure, according to one embodiment of the present invention.

FIG. 21A illustrates a flowchart of an Execute procedure, according to one embodiment of the present invention. In one embodiment, P-EXECUTE can be implemented by an interconnectable block system as an Execute procedure. As illustrated, at 2101, the system runs the GETINFO command and receives data describing the active interconnectable block. At 2102, if the active interconnectable block is END interconnectable block, the system exits, as illustrated at 2103. At 2104, the system runs the GETBP command and receives an interconnectable block breakpoint state. If the state of the active interconnectable block indicates a breakpoint state, at 2105, the system then runs the GLOWLED command with color information to electroluminescent device to indicate that a breakpoint was detected; thereafter control is transferred back to 2101, where the system restarts the procedure from the beginning. If, however, at 2105, no breakpoint state is detected, the system resets electroluminescent device by running GLOWLED command with zeros (to indicate a switching off of electroluminescent device), as illustrated at 2106. At 2108, EXEC command is run. Here, the active interconnectable block receives the command and performs action according to its programmed firmware and parameters formed by the symbol interconnectable blocks sequence provided (if any). Control is then transferred to 2112 where the system determines whether there is a need to perform a right diversion. If it is determined that a right diversion needs to be performed, the active interconnectable block passes control to the next interconnectable block through one of its outputs, as described above, and as illustrated at 2109. If it is determined that a right diversion does not need to be performed, at 2112, then control is transferred to 2150 where the P-SKIP (table 2) is performed, in one embodiment, as identified by reference 'E'. Control is then transferred to Update Line Procedure 1900 as identified by reference 'C'. Thus, FLOWDIFF variable information will be received and evaluated at 2111. As indicated, at 2111, if it is determined that the value of FLOWDIFF is less than −1 or greater than 1 then control is transferred to Error Procedure 2000, as identified by reference 'A' and the procedure stops. If however, at 2111, the condition is not satisfied, control flows to 2110 where it is determined whether FLOWDIFF value equals to −1. If the condition is satisfied, then the system then perform Loop Procedure 2200, as identified by reference 'D', and control is transferred to 2101. If the condition at 2110 is not satisfied, then control flows directly to 2101. If condition at 2110 is satisfied, then the procedure repeats, as described above. Thus, in one embodiment, the above signifies that a left diversion was detected, and it is possible that an end of the loop program interconnectable block was detected, and may require repetition of execution of the procedure from the last interconnectable block which has the same FLOWNUM value (corresponding to execution flow depth) and performed a right diversion.

Figure 21B:
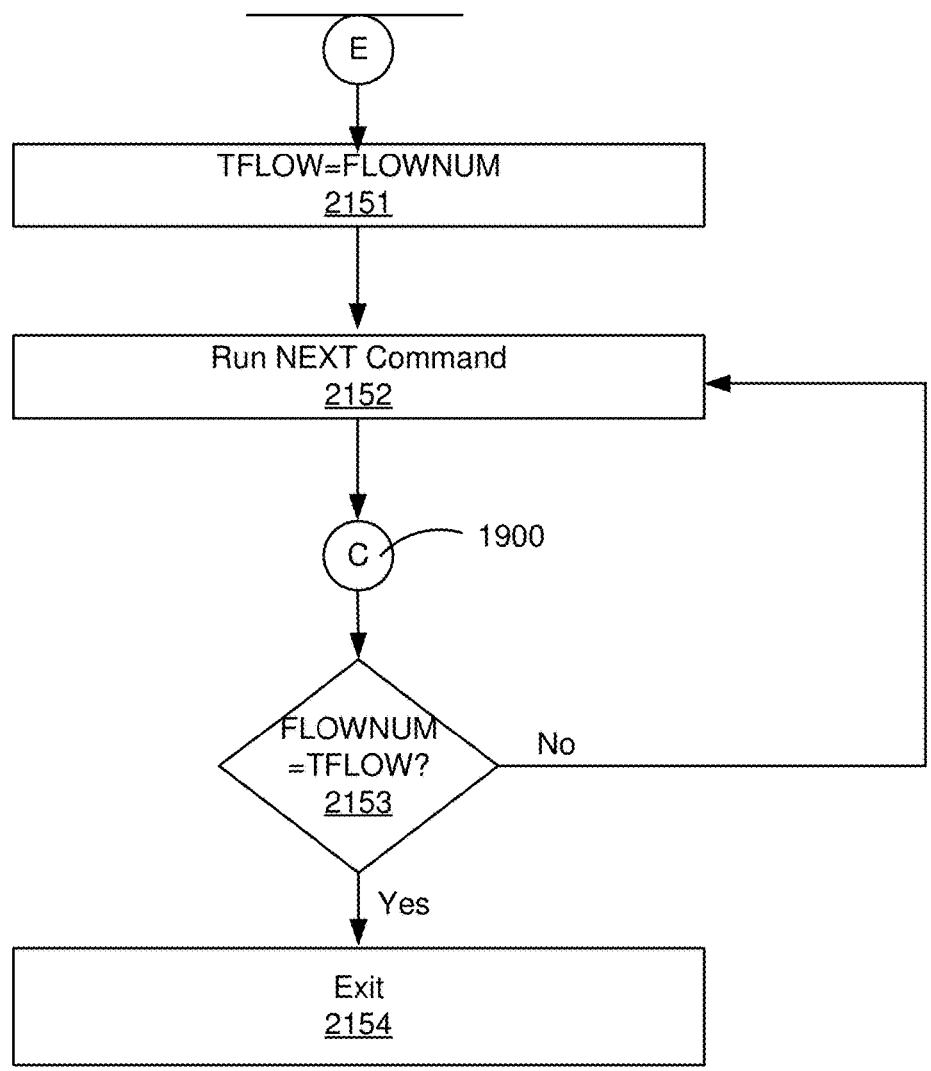
FIG. 21B illustrates a flowchart of a Skip procedure, according to one embodiment of the present invention.

FIG. 21B illustrates a flowchart 1950 describing a Skip procedure, according to one embodiment of the present invention. In one embodiment, P-SKIP can be implemented by an interconnectable block system as a Skip procedure. As illustrated, at 2151 temporary flow variable TFLOW stores the current value of FLOWNUM. At 2152, the NEXT command is performed. Thereafter control is then transferred to Update Line Procedure 1900 as identified by reference 'C'. At 2153, it is determined whether the current value of FLOWNUM (after running the update line procedure 1900) is equal to the value saved at TFLOW variable. IF the condition at 2153 is not met, control is transferred back to 2152 where the NEXT command is performed. If however, the condition at 2153 is satisfied, the procedure exits, as illustrated by 2154.

Figure 22:
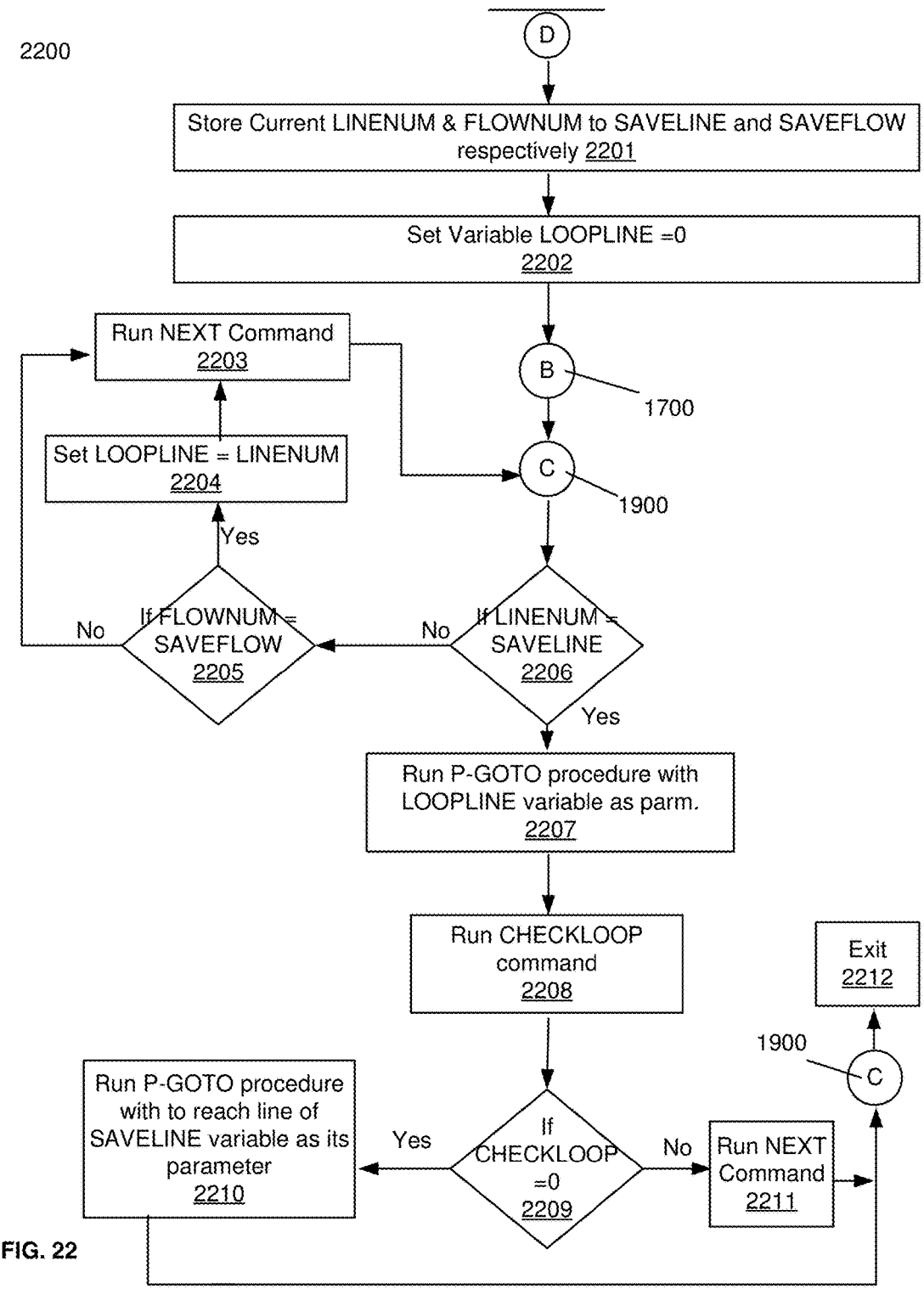
FIG. 22 illustrates, a flowchart 2200 of a loop procedure, according to one embodiment of the present invention.

FIG. 22 illustrates, a flowchart 2200 of a loop procedure, according to one embodiment of the present invention. In one embodiment, the loop procedure can be implemented as P-LOOP procedure, as illustrated. At 2201 the current values of LINENUM and FLOWNUM variables are saved to SAVLINE and SAVFLOW variables respectively. At 2202 variable LOOPLINE is set to 0. Thereafter, Restart Procedure 1700 is executed, as identified by T'. Main unit 801, in one embodiment, performs Update Line Procedure 1900 as identified by 'C'. At 2206, if it is determined that LINENUM does not equal SAVLINE, then at 2205, it is determined whether FLOWNUM equals to SAVFLOW. If so, then the value of LINENUM is saved into LOOPLINE variable, at 2204. Thereafter the NEXT command is executed, at 2203. If however, the condition at 2205 is not satisfied then control is directly transferred to 2203. From 2203, control is transferred to Update Line Procedure 1900, as illustrated. If however, at 2206 is condition is satisfied, then control passes on to 2207 where P-GOTO Procedure 1800 is executed with LOOPLINE variable (the last line number with the same FLOWNUM value as at the beginning of the procedure) passed in as its parameter. In one embodiment, this line can correspond to the last interconnectable block with the right diversion. At 2208, the CHECKLOOP command is executed. Here, if the response received is zero, as illustrated at 2209, then the Goto Procedure 1800 is executed with the line of SAVELINE variable provided as its parameter, as illustrated at 2210. If however, the condition at 2209 is not satisfied then control flows to 2211 where the NEXT command is executed. Thereafter, control is transferred to Update Line Procedure 1900 and the procedure exits, as illustrated at 2212.

Figure 23:
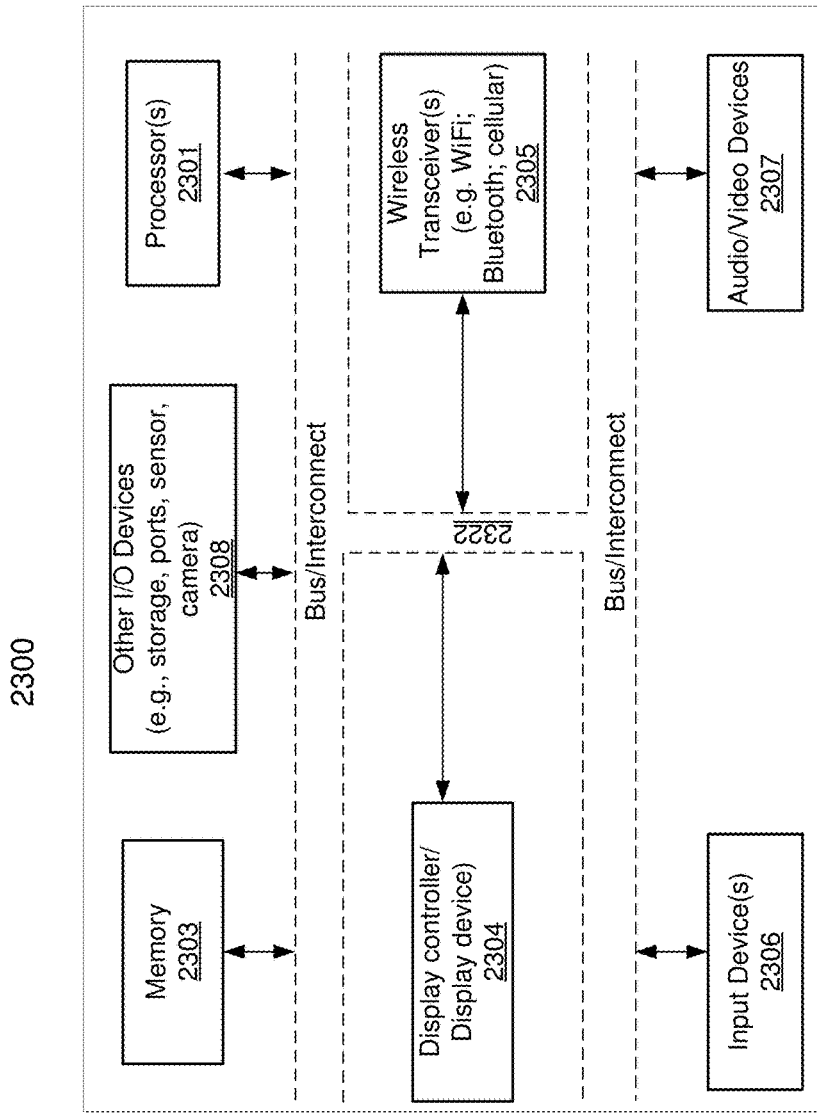
FIG. 23 is an interconnectable block diagram illustrating a data processing system such as a computing system 2300 which may be used with one embodiment of the invention.

FIG. 23 is an interconnectable block diagram illustrating a data processing system such as a computing system 2300 which may be used with one embodiment of the invention. For example, system 2300 can be implemented as part of an interconnectable block system. It should be apparent from this description that aspects of the present invention can be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

In one embodiment, system 2300 can represent main unit 801 or line start interconnectable block 802. System 2300 can have a distributed architecture having a plurality of nodes coupled through a network, or all of its components may be integrated into a single unit. Computing system 2300 can represent any of the data processing systems described above performing any of the processes or methods described above. In one embodiment, computer system 2300 can be implemented as integrated circuits (ICs), discrete electronic devices, modules adapted to a circuit board such as a motherboard, an add-in card of the computer system, and/or as components that can be incorporated within a chassis/case of any computing device. System 2300 is intended to show a high level view of many components of any data processing unit or computer system. However, it is to be understood that additional or fewer components may be present in certain implementations and furthermore, different arrangement of the components shown may occur in other implementations. System 2300 can represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 2300 includes processor 2301, memory 2303, and devices 2305-2308 via a bus or an interconnect 2322. Processor 2301 can represent a single processor or multiple processors with a single processor core or multiple processor cores included therein. Processor 2301 can represent one or more general-purpose processors such as a microprocessor, a central processing unit (CPU), Micro Controller Unit (MCU), etc. Processor 2301 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 2301 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 2301, can also be a low power multi-core processor socket such as an ultra-low voltage processor, may act as a main processing unit and central hub for communication with the various components of the system. Such processor can be implemented as a system on chip (SoC).

Processor 2301 is configured to execute instructions for performing the operations and methods discussed herein. System 2300 further includes a graphics interface that communicates with graphics subsystem 2304, which may include a display controller and/or a display device. Processor 2301 can communicate with memory 2303, which in an embodiment can be implemented via multiple memory devices to provide for a given amount of system memory. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector. Memory 2303 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 2303 may store information including sequences of executable program instructions that are executed by processor 2301, or any other device. System 2300 can further include IO devices such as devices 2305-2308, including wireless transceiver(s) 2305, input device(s) 2306, audio IO device(s) 2307, and other IO devices 2308.

Wireless transceiver 2305 can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 2306 can include a mouse, a touch pad, a touch sensitive screen (which may be integrated with display device 2304), a pointer device such as a stylus, and/or a keyboard (e.g., physical keyboard or a virtual keyboard displayed as part of a touch sensitive screen). Other optional devices 2308 can include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 2308 can further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 2322 via a sensor hub (not shown), while other devices such as a keyboard or thermal sensor may be controlled by an embedded controller (not shown), dependent upon the specific configuration or design of system 2300.

To provide for persistent storage of information such as data, applications, one or more operating systems and so forth, in one embodiment, a mass storage (not shown) may also couple to processor 2301. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 2301, e.g., via a serial peripheral interface (SPI). This flash device may provide for non-volatile storage of system software, including a basic input/output software (BIOS) as well as other firmware of the system.

Note that while system 2300 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium to implement an interconnectable block system. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:
1. An interconnectable block based system comprising:
a plurality of interconnectable blocks; and a processing unit, coupled to the plurality of interconnectable blocks, configured to:
determine a programming language construct, or a portion thereof, based on a sequence in which the plurality of interconnectable blocks are connected to each other,
execute the programming language construct, or the portion thereof, to generate an output, and
transmit the output to an output device, wherein the output device is at least an electroacoustic transducer device or an electroluminescent device, wherein the output device is coupled to the interconnectable block based system;
wherein at least one interconnectable block has at least one pinhole that can accommodate another electroluminescent device to indicate a particular state of the at least one interconnectable block.

2. The interconnectable block based system of claim 1, wherein the output device is embedded within at least one of the plurality of interconnectable blocks.

3. The interconnectable block based system of claim 1, wherein the plurality of interconnectable blocks includes at least one of a start interconnectable block, an end interconnectable block, a command interconnectable block, a symbol interconnectable block, or an operator interconnectable block.

4. The interconnectable block based system of claim 1, wherein the at least one pinhole is further configured to accommodate a special pin to establish a break point.

5. The interconnectable block based system of claim 1, wherein at least one interconnectable block is further configured to accommodate an electronic debugger to determine an error or inconsistency in the programming language construct, or the portion thereof.

6. The interconnectable block based system of claim 5, wherein the processing unit is further configured to:
transmit an error code to an interface indicating the error or inconsistency.

7. A method to operate an interconnectable block based system, comprising:
determining, by a processing unit, a programming language construct, or a portion thereof, based on a sequence in which a plurality of interconnectable blocks are connected to each other;
executing the programming language construct, or the portion thereof, to generate an output; and
transmitting the output to an output device, wherein the output device is at least an electroacoustic transducer device or an electroluminescent device, wherein the output device is coupled to the plurality of connected interconnectable blocks;
wherein at least one interconnectable block has at least one pinhole that can accommodate another electroluminescent device to indicate a particular state of the at least one interconnectable block.

8. The method of claim 7, wherein the output device is embedded within at least one of the plurality of interconnectable blocks.

9. The method of claim 7, wherein the plurality of interconnectable blocks includes at least one of a start interconnectable block, an end interconnectable block, a command interconnectable block, a symbol interconnectable block, or an operator interconnectable block.

10. The method of claim 7, wherein the at least one pinhole is further configured to accommodate a special pin to establish a break point.

11. The method of claim 7, wherein at least one interconnectable block is further configured to accommodate an electronic debugger to determine an error or inconsistency in the programming language construct, or the portion thereof.

12. The method of claim 11, further comprising:
transmitting an error code to an interface indicating the error or inconsistency.

13. A non-transitory computer readable medium comprising instructions which when executed by a processing system, including at least one processing core, of an interconnectable block based system, implements a method comprising:
determining a programming language construct, or a portion thereof, based on a sequence in which a plurality of interconnectable blocks are connected to each other;
executing the programming language construct, or the portion thereof, to generate an output; and
transmitting the output to an output device, wherein the output device is at least an electroacoustic transducer device or an electroluminescent device, wherein the output device is coupled to the plurality of connected interconnectable blocks;
wherein at least one interconnectable block has at least one pinhole that can accommodate another electroluminescent device to indicate a particular state of the at least one interconnectable block.

14. The non-transitory computer readable medium of claim 13, wherein the output device is embedded within at least one of the plurality of interconnectable blocks.

15. The non-transitory computer readable medium of claim 13, wherein the plurality of interconnectable blocks includes at least one of a start interconnectable block, an end interconnectable block, a command interconnectable block, a symbol interconnectable block, or an operator interconnectable block.

16. The non-transitory computer readable medium of claim 13, wherein the at least one pinhole is further configured to accommodate a special pin to establish a break point.

17. The non-transitory computer readable medium of claim 13, wherein at least one interconnectable block is further configured to accommodate an electronic debugger to determine an error or inconsistency in the programming language construct, or the portion thereof.

18. The non-transitory computer readable medium of claim 17, further comprising:
transmitting an error code to an interface indicating the error or inconsistency.

* * * * *